(12) United States Patent
Ichiyama et al.

(10) Patent No.: US 10,394,445 B2
(45) Date of Patent: Aug. 27, 2019

(54) TEXT FIELD INPUT SELECTION BASED ON SELECTING A KEY ON A GRAPHICALLY DISPLAYED KEYBOARD

(71) Applicant: Konica Minolta, Inc., Chiyoda-ku (JP)

(72) Inventors: Shohei Ichiyama, Toyokawa (JP); Toshimi Shinchi, Saitama (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 1115 days.

(21) Appl. No.: 14/258,519

(22) Filed: Apr. 22, 2014

(65) Prior Publication Data

US 2014/0317550 A1    Oct. 23, 2014

(30) Foreign Application Priority Data

Apr. 22, 2013  (JP) .................................. 2013-089212

(51) Int. Cl.
*G06F 3/0488*   (2013.01)
(52) U.S. Cl.
CPC ................................ *G06F 3/04886* (2013.01)
(58) Field of Classification Search
None
See application file for complete search history.

(56) References Cited

U.S. PATENT DOCUMENTS

| | | | | |
|---|---|---|---|---|
| 4,885,580 A | * | 12/1989 | Noto | H04M 1/247 341/23 |
| 5,796,404 A | * | 8/1998 | Gentner | G06F 3/0489 345/168 |
| 7,153,690 B2 | * | 12/2006 | Stevens | G05D 11/138 436/51 |
| 7,913,184 B1 | * | 3/2011 | Zhang | G06F 17/243 715/224 |
| 8,745,057 B1 | * | 6/2014 | Li | G06F 17/30247 707/737 |
| 9,037,598 B1 | * | 5/2015 | Morton | G06F 16/2477 707/767 |
| 2002/0167545 A1 | * | 11/2002 | Kang | G06F 3/0238 715/780 |
| 2003/0154292 A1 | * | 8/2003 | Spriestersbach | G06F 3/0219 709/228 |
| 2005/0179647 A1 | * | 8/2005 | Simmons | G06F 3/023 345/156 |

(Continued)

FOREIGN PATENT DOCUMENTS

| | | | | |
|---|---|---|---|---|
| EP | 0464712 A2 | * | 1/1992 | ......... G06F 3/04886 |
| JP | 2001-014087 A | | 1/2001 | |

(Continued)

*Primary Examiner* — Shourjo Dasgupta
(74) *Attorney, Agent, or Firm* — Buchanan Ingersoll & Rooney PC

(57) ABSTRACT

An MFP (Multi-Functional Peripheral) as an information processing apparatus accepts an input through a keyboard selectively displayed on the touch panel of an operation terminal from among a plurality of keyboards configured with software key groups different from each other. The MFP displays a setting screen including a plurality of input areas on the touch panel. When the setting screen appears, the MFP acquires the type of the selectively displayed keyboard and decides an input accepting area that accepts an input through the selectively displayed keyboard, from among the plurality of input areas.

18 Claims, 26 Drawing Sheets

(56) References Cited

U.S. PATENT DOCUMENTS

| | | | | |
|---|---|---|---|---|
| 2008/0195960 A1* | 8/2008 | Bostock | ............ | G06F 17/30899 715/767 |
| 2009/0225041 A1* | 9/2009 | Kida | ................... | G06F 3/0237 345/173 |
| 2010/0060585 A1* | 3/2010 | Chiu | ................... | G06F 3/04886 345/168 |
| 2011/0285656 A1* | 11/2011 | Yaksick | ............. | G06F 3/04883 345/173 |
| 2011/0302518 A1* | 12/2011 | Zhang | .................. | G06F 3/0234 715/773 |
| 2012/0127078 A1* | 5/2012 | Vecera | ................. | G06F 3/0233 345/168 |
| 2012/0287048 A1* | 11/2012 | Kim | ................... | G06F 3/04886 345/168 |
| 2013/0234945 A1* | 9/2013 | Goktekin | ............ | G06K 9/3258 345/168 |
| 2013/0283195 A1* | 10/2013 | Bilgen | ................. | G06F 3/0485 715/767 |
| 2014/0320413 A1* | 10/2014 | Goktekin | ............ | G06K 9/3258 345/168 |

FOREIGN PATENT DOCUMENTS

| | | |
|---|---|---|
| JP | 2009-147734 A | 7/2009 |
| JP | 2010-087570 A | 4/2010 |

\* cited by examiner

FIG.24
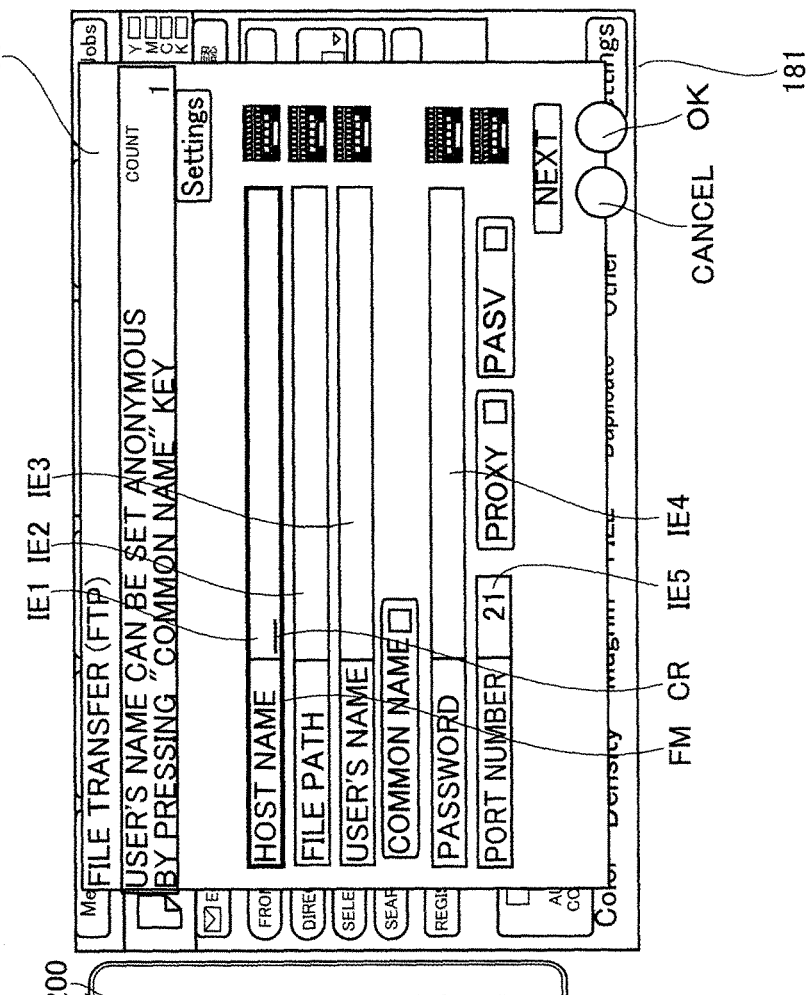
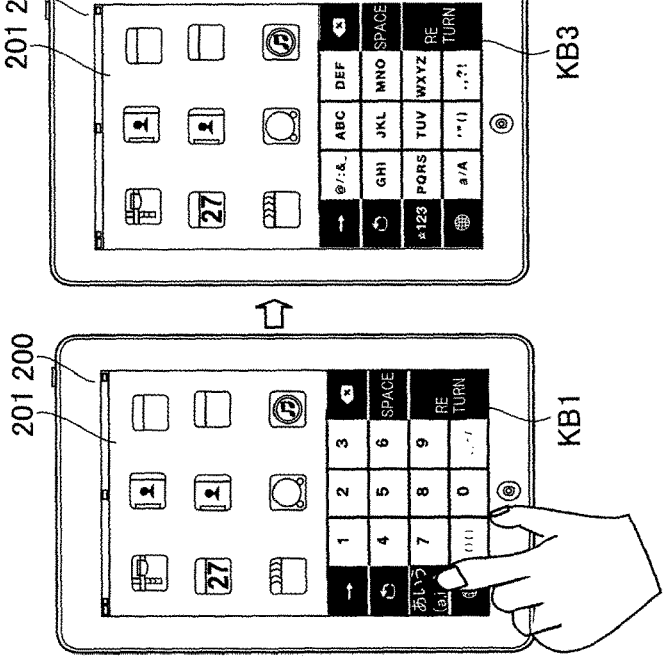

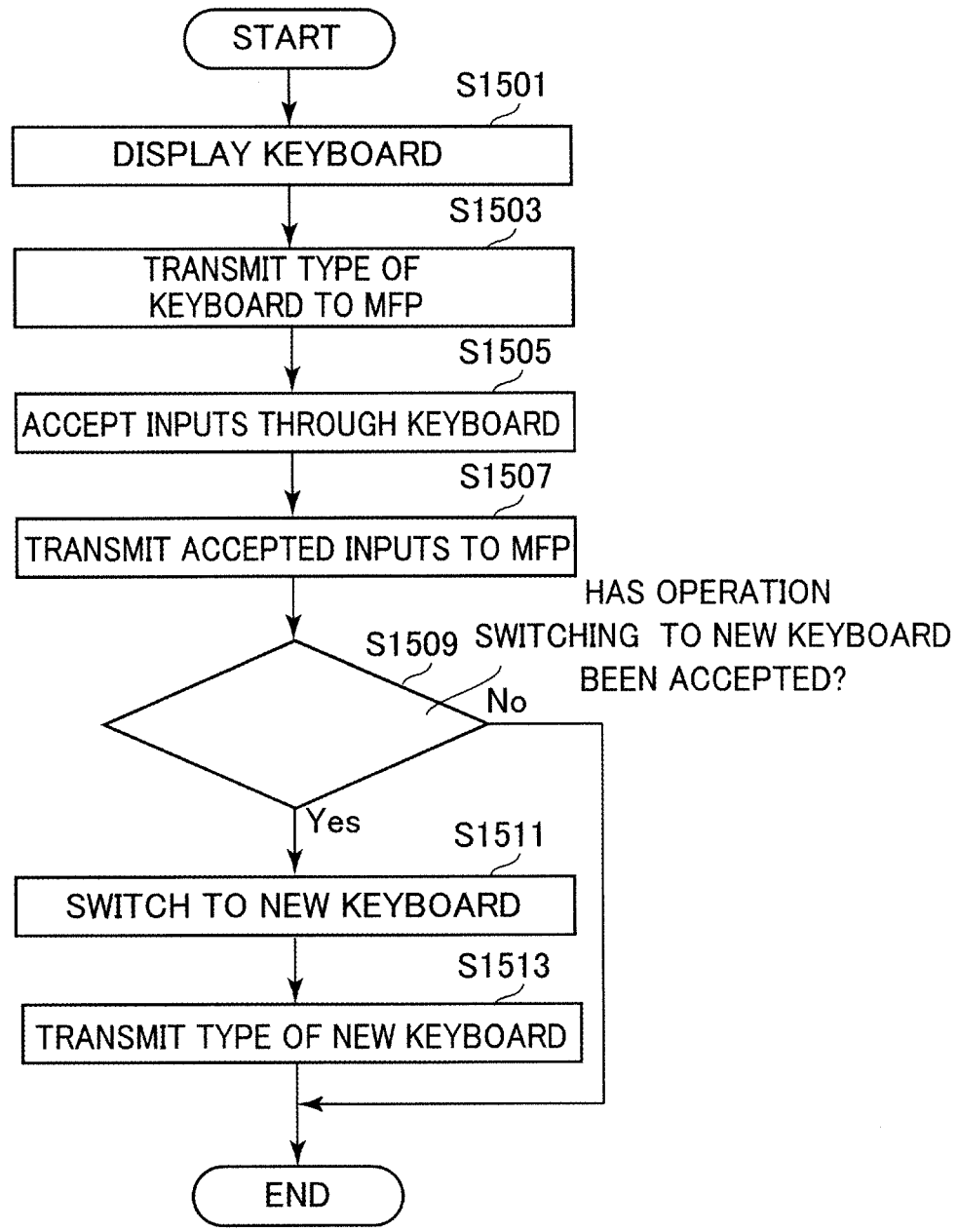

TEXT FIELD INPUT SELECTION BASED ON SELECTING A KEY ON A GRAPHICALLY DISPLAYED KEYBOARD

This application is based on Japanese Patent Application No. 2013-89212 filed with the Japan Patent Office on Apr. 22, 2013, the entire content of which is hereby incorporated by reference.

BACKGROUND OF THE INVENTION

Field of the Invention

The present invention relates to an information processing apparatus that accepts inputs from an input screen, and more particularly to an information processing apparatus that accepts inputs through an input screen selectively displayed on a display of an operation terminal from a plurality of input screens configured with software key groups different from each other.

Description of the Related Art

Portable information terminals such as smart phones and tablet PCs (Personal Computers) have recently been sophisticated, and people own individual portable information terminals instead of PCs. Portable information terminals allow users to view and edit electronic documents anywhere as desired. Portable information terminals have been used in various situations in business and daily life.

With the sophistication of portable information terminals, there is a demand for cooperation between an image forming apparatus and a portable information terminal in a display system including an image forming apparatus equipped with an operation panel and a portable information terminal capable of communicating with the image forming apparatus.

In general, an image forming apparatus includes an operation panel that displays setting screens. A setting screen accepts settings of a variety of jobs and includes a plurality of input areas (input value display areas). When accepting a touch operation in an input area from the user, the image forming apparatus sets the input area in a selected state and accepts inputs into the selected input area through a variety of software keys (for example, soft ten-key pad) displayed on the operation panel or a variety of hardware keys (for example, hard ten-key pad) of the operation panel.

An example of the cooperation between an image forming apparatus and a portable information terminal is that the image forming apparatus accepts an input into an input area in a setting screen appearing on the operation panel, through a keyboard appearing on the display of the portable information terminal, in place of the software keys or hardware keys of the operation panel.

Document 1 below discloses a technique that facilitates activation of functions of a portable terminal using a keyboard. The portable terminal in Document 1 includes a display and a keyboard. The portable terminal displays a command input area for accepting input of a command (statement) and accepts input of a command from the keyboard. The portable terminal performs the function corresponding to the input command (for example, starting up a menu screen).

Document 1: Japanese Laid-Open Patent Publication No. 2010-87570

The configuration above, however, complicates the operation with the portable information terminal.

The portable information terminal has a plurality of keyboards having software key groups different from each other (for example, a keyboard for inputting Japanese characters, a keyboard for inputting numbers, and a keyboard for inputting alphabetic characters) and selectively displays one of those keyboards on the display. The input areas in a setting screen appearing on the operation panel of the image forming apparatus may include an input area that only accepts inputs of alphabetic characters and numbers, such as an input area for accepting a password entry. Some input areas only accept inputs of Japanese characters, such as an input area for accepting a user name entry.

For example, in a case where the keyboard appearing on the portable information terminal is a keyboard for inputting numbers (ten-key pad), when the selected input area in the setting screen is an input area that accepts only inputs of Japanese characters, the user has to switch the keyboard to be displayed on the portable information terminal to a keyboard for inputting Japanese characters or switch the selected input area in the setting screen to an input area that accepts number inputs. In a case where the keyboard appearing on the portable information terminal is a keyboard for inputting alphabetic characters, when the selected input area in the setting screen is an input area that only accepts number inputs (ten-key inputs), the user has to switch the keyboard to be displayed on the portable information terminal to a keyboard for inputting numbers or switch the selected input area in the setting screen to an input area that accepts alphabetic inputs.

This is not a problem peculiar to the case where an image forming apparatus and a portable information terminal cooperate but possibly occurs in the operation terminal in a case where the information processing apparatus accepts inputs through an input screen selectively displayed on the display of the operation terminal from a plurality of input screens configured with software key groups different from each other.

An object of the present invention is to provide an information processing apparatus with the ease of operation on an operation terminal.

SUMMARY OF THE INVENTION

An information processing apparatus according to an aspect of the present invention accepts an input through an input screen selectively displayed on a display of an operation terminal from among a plurality of input screens configured with software key groups different from each other. The information processing apparatus includes: a body display unit; an area display unit for displaying, on the body display unit, a plurality of input areas that can accept an input through a software key included in any one of the plurality of input screens; a type acquisition unit for acquiring a type of an input screen appearing on the display of the operation terminal when the plurality of input areas are displayed by the area display unit; and an area decision unit for deciding an input accepting area that accepts an input through the input screen appearing on the display of the operation terminal, from among the plurality of input areas, based on the type acquired by the type acquisition unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 24 is a diagram illustrating operation of MFP 100 and operation terminal 200 in a case where a keyboard to be displayed on touch panel 201 is switched to keyboard KB3 in the fifth embodiment of the present invention.

FIG. 26 is a flowchart showing operation of operation terminal 200 in the fifth embodiment of the present invention.

DESCRIPTION OF THE PREFERRED EMBODIMENTS

Embodiments of the present invention will be described below with reference to the figures.

In the following embodiments, the information processing apparatus is an MFP (Multi-Functional Peripheral), by way of example. The information processing apparatus, however, may be an image forming apparatus other than an MFP, such as a facsimile machine, a copier, or a printer. The information processing apparatus may be the one other than an image forming apparatus, such as a PC, a tablet PC, or a mobile phone.

In this specification, "symbols" refer to those that serve the function of representing certain phenomena and contents, excluding characters, and are able to be perceived.

[First Embodiment]
(Configuration of Image Forming System)

First, the configuration of an image forming system in the present embodiment will be described.

Figure 1:
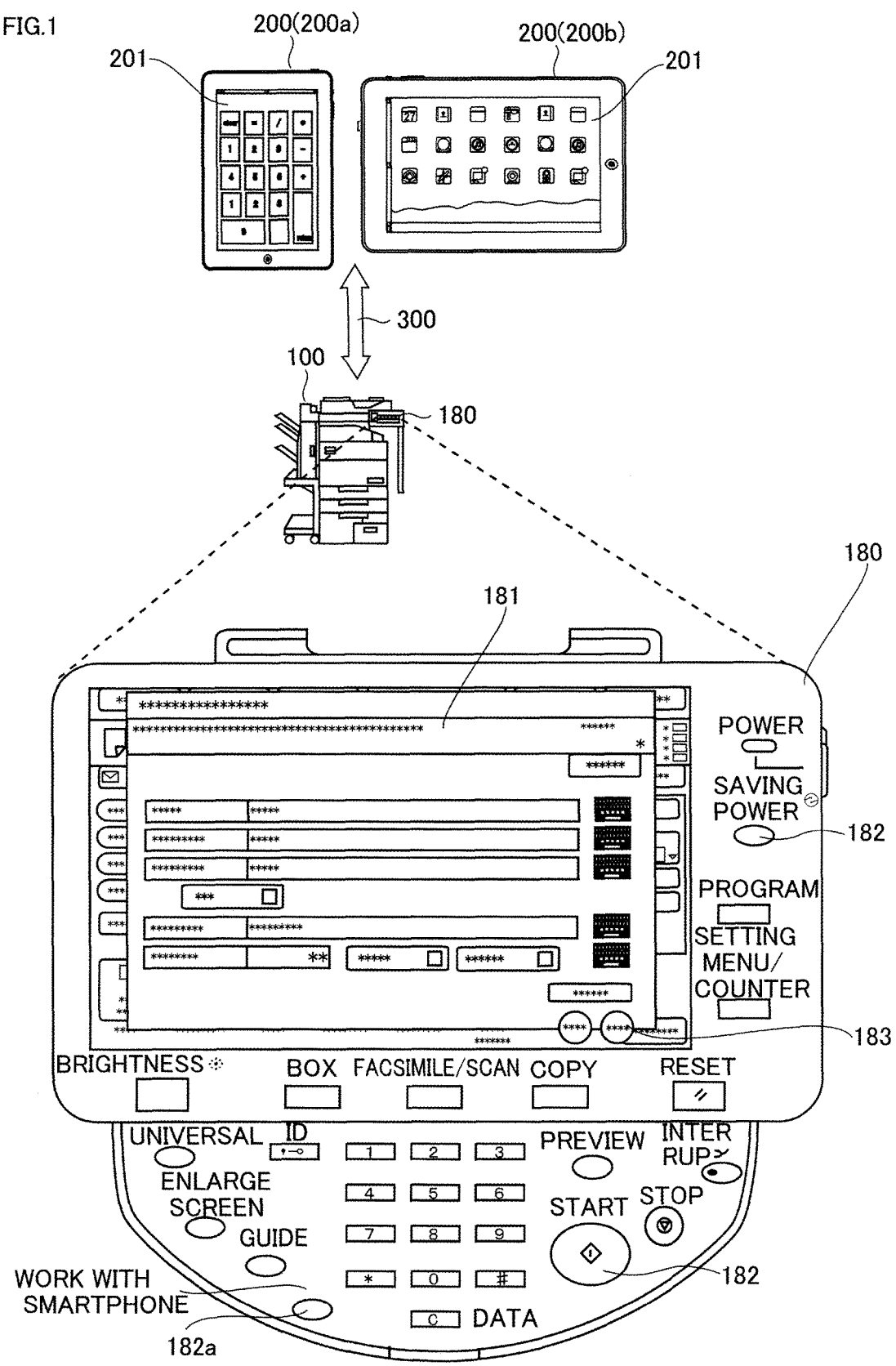
FIG. 1 is a conceptual diagram showing an image forming system in a first embodiment of the present invention.

FIG. 1 is a conceptual diagram showing the image forming system in a first embodiment of the present invention. FIG. 1 shows an enlarged view of operation panel 180 of MFP 100.

Referring to FIG. 1, the image forming system in the present embodiment includes an MFP 100 (an example of the information processing apparatus) and an operation terminal 200. MFP 100 and operation terminal 200 are connected to a network 300 and can communicate with each other through network 300.

MFP 100 includes an operation panel 180. Operation panel 180 includes a touch panel 181 (an example of the body unit display) and a variety of hardware keys 182. MFP 100 displays a variety of information on touch panel 181. MFP 100 accepts an operation from a user through, for example, hardware keys 182 or software keys 183 included in a setting screen appearing on touch panel 181.

Examples of operation terminal 200 include a smartphone 200a and a tablet terminal 200b. Other examples of operation terminal 200 include an operation panel detached from another device. Operation terminal 200 includes a touch panel 201. Operation terminal 200 displays a variety of information including keyboards (an example of the input screen) on touch panel 201. Operation terminal 200 accepts an operation from a user through touch panel 201. FIG. 1 shows a ten-key keyboard appearing on touch panel 201 of smart phone 200a.

Network 300 is a LAN (Local Area Network), either wired or wireless. Network 300 is connected with a protocol such as TCP/IP (Transmission Control Protocol/Internet Protocol). Devices connected to network 300 can exchange various data with each other. The devices may be connected through a wide area network such as the Internet and dedicated networks, in place of network 300.

Specifically, operation terminal 200 is wirelessly connected to network 300, for example, through a wireless LAN access point (not shown). MFP 100 and operation terminal 200 may communicate with each other via near field communication such as Bluetooth (registered trademark).

The image forming system may further include devices other than MFP 100 and operation terminal 200 or may further include a plurality of operation terminals 200 communicating with MFP 100.

When accepting a press on a "work with smartphone" key 182a, which is one of hardware keys 182, MFP 100 searches for an operation terminal ready for communication with MFP 100 and starts communication with the found operation terminal 200. When communication between MFP 100 and operation terminal 200 is started, operation terminal 200 functions as an input unit for making an input into operation panel 180 of MFP 100.

Figure 2:
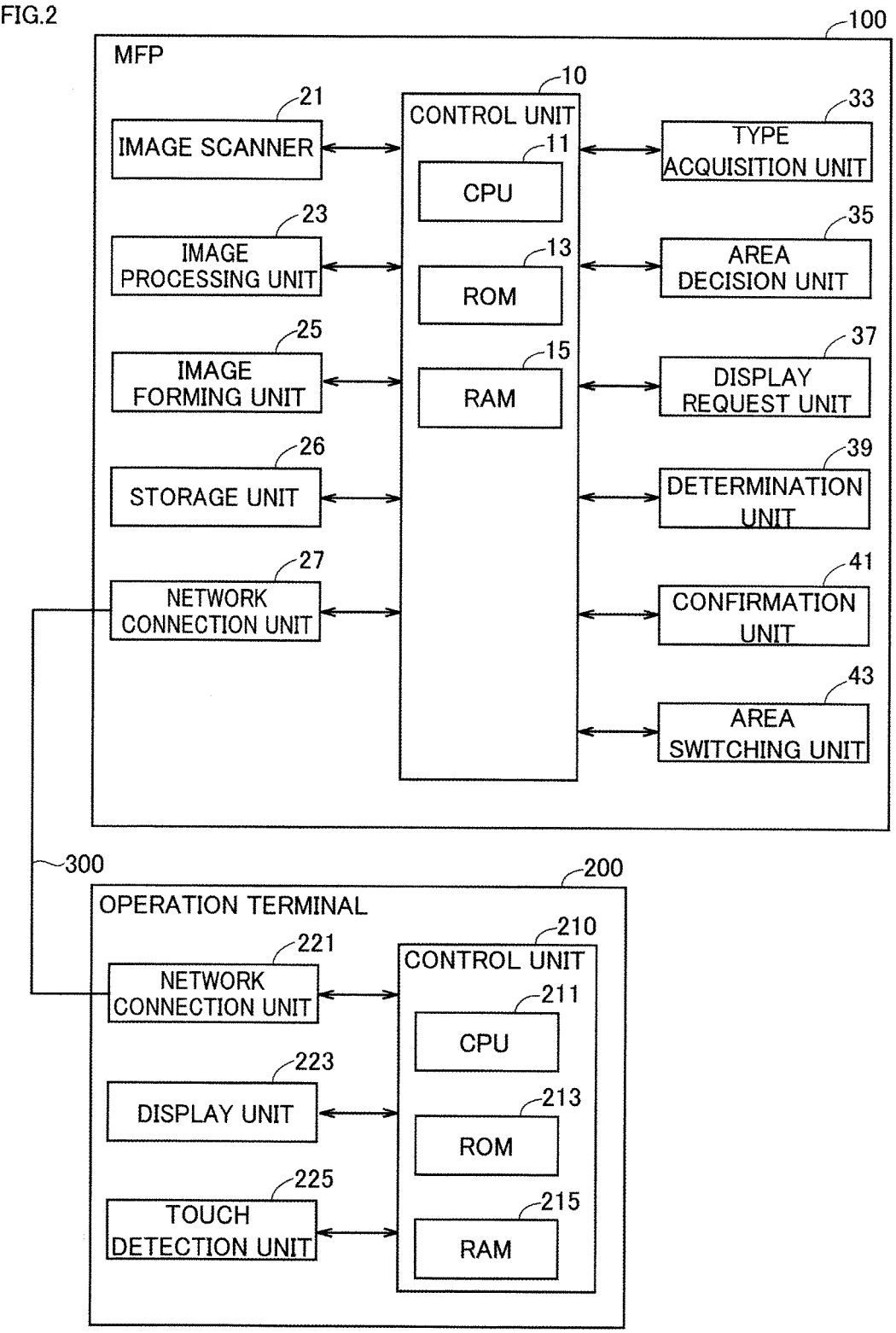
FIG. 2 is a block diagram showing a functional configuration of the image forming system in the first embodiment of the present invention.

FIG. 2 is a block diagram showing a functional configuration of the image forming system in the first embodiment of the present invention.

Referring to FIG. 2, MFP 100 includes a control unit 10, an image scanner 21, an image processing unit 23, an image forming unit 25, a storage unit 26, a network connection unit 27, a type acquisition unit 33, an area decision unit 35, a display request unit 37, a determination unit 39, a confirmation unit 41, and an area switching unit 43. Control unit 10 is connected with each of image scanner 21, image processing unit 23, image forming unit 25, storage unit 26, network connection unit 27, type acquisition unit 33, area decision unit 35, display request unit 37, determination unit 39, confirmation unit 41, and area switching unit 43.

Control unit 10 centrally controls the operation of each unit in MFP 100. Control unit 10 includes a CPU (Central Processing Unit) 11, a ROM (Read Only Memory) 13, and a RAM (Random Access Memory) 15. CPU 11 reads out a necessary program from ROM 13 and centrally controls MFP 100 in accordance with the program. ROM 13 stores a variety of programs. RAM 15 is a work area for CPU 11.

Image scanner 21 scans a document image.

Image processing unit 23 creates print data of an image to be printed based on a print instruction from operation panel 180, operation terminal 200, or other devices.

Image forming unit 25 forms an image on paper based on print data created by image processing unit 23.

Storage unit 26 is, for example, an HDD (Hard Disk Drive) for storing a variety of information such as setting screens to be displayed on operation panel 180.

Network connection unit 27 transmits/receives data to/from an external device such as operation terminal 200 through network 300.

Type acquisition unit 33 acquires, from operation terminal 200, the type of the keyboard appearing on touch panel 201 of operation terminal 200.

The area decision unit 35 decides an input area (input accepting area) that accepts an input through the keyboard appearing on touch panel 201.

Display request unit 37 requests operation terminal 200 to display a keyboard that includes software keys allowing input into a particular input area.

Determination unit 39 determines whether MFP 100 can communicate with operation terminal 200.

Confirmation unit 41 confirms the input accepted in an input area in the setting screen appearing on touch panel 181.

Area switching unit 43 switches an input area for accepting an input to the input area that can accept an input through the software keys included in the keyboard of the type acquired by type acquisition unit 33.

Operation terminal 200 includes a control unit 210, a network connection unit 221, a display unit 223, and a touch detection unit 225. Control unit 210 is connected with each of network connection unit 221, display unit 223, and touch detection unit 225.

Control unit 210 centrally controls the operation of each unit in operation terminal 200. Control unit 210 includes a CPU 211, a ROM 213, and a RAM 215. CPU 211 reads out a necessary program from ROM 213 and centrally controls operation terminal 200 in accordance with the program. ROM 213 stores a variety of programs. RAM 215 is a work area for CPU 211.

Network connection unit 221 transmits/receives data to/from an external device such as MFP 100 through network 300.

Display unit 223 displays a variety of information including keyboards on touch panel 201.

Touch detection unit 225 detects a touch on touch panel 201.

Figure 3:
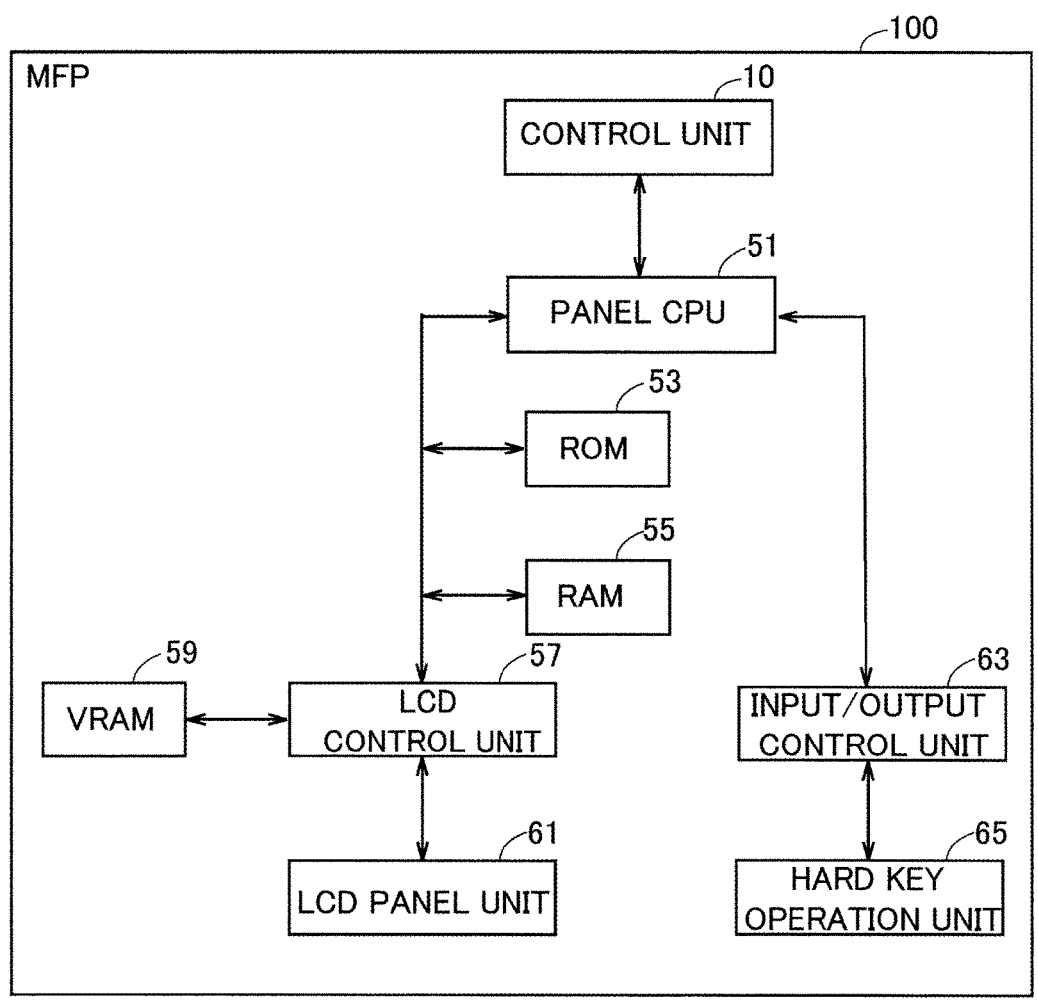
FIG. 3 is a block diagram schematically showing a control configuration related to operation panel 180 in MFP 100 in the first embodiment of the present invention.

FIG. 3 is a block diagram schematically showing a control configuration related to operation panel 180 in MFP 100 in the first embodiment of the present invention.

Referring to FIG. 3, MFP 100 includes control unit 10, a panel CPU 51, a ROM 53, a RAM 55, an LCD (Liquid Crystal Display) control unit 57, a VRAM (Video RAM) 59, an LCD panel unit 61, an input/output control unit 63, and a hard key operation unit 65.

Panel CPU 51 centrally controls operation panel 180 and communicates with control unit 10 centrally controlling MFP 100. ROM 53 stores control programs for operation panel 180 and a variety of setting screens (display images). RAM 55 is a work memory for panel CPU 51.

LCD control unit 57 performs read/write control for VRAM 59 and performs image display control on LCD panel unit 61. Panel CPU 51 allows VRAM 59 to store an image stored in ROM 53 through LCD control unit 57. Panel CPU 51 outputs an image read out from ROM 53 to LCD panel unit 61.

LCD panel unit 61 is a touch panel. When accepting a touch on LCD panel unit 61, input/output control unit 63 determines the position of the touch and notifies panel CPU 51 of the function selected on the setting screen for input control such as function setting.

Hard key operation unit 65 includes hardware keys (hard keys) including, for example, a start key, a ten-key pad, and a panel reset key, an LED (Light Emitting Diode) indicating a status of the machine, and a buzzer for giving a notice that an input is accepted on the hardware keys or LCD panel unit 61. Hard key operation unit 65 is controlled by input/output control unit 63 and communicates with control unit 10 through panel CPU 51, if necessary.

When the start key in hard key operation unit 65 is pressed, control unit 10 is notified of the press on the start key through input/output control unit 63 and panel CPU 51, thereby starting a series of copy operation.

Figure 4:
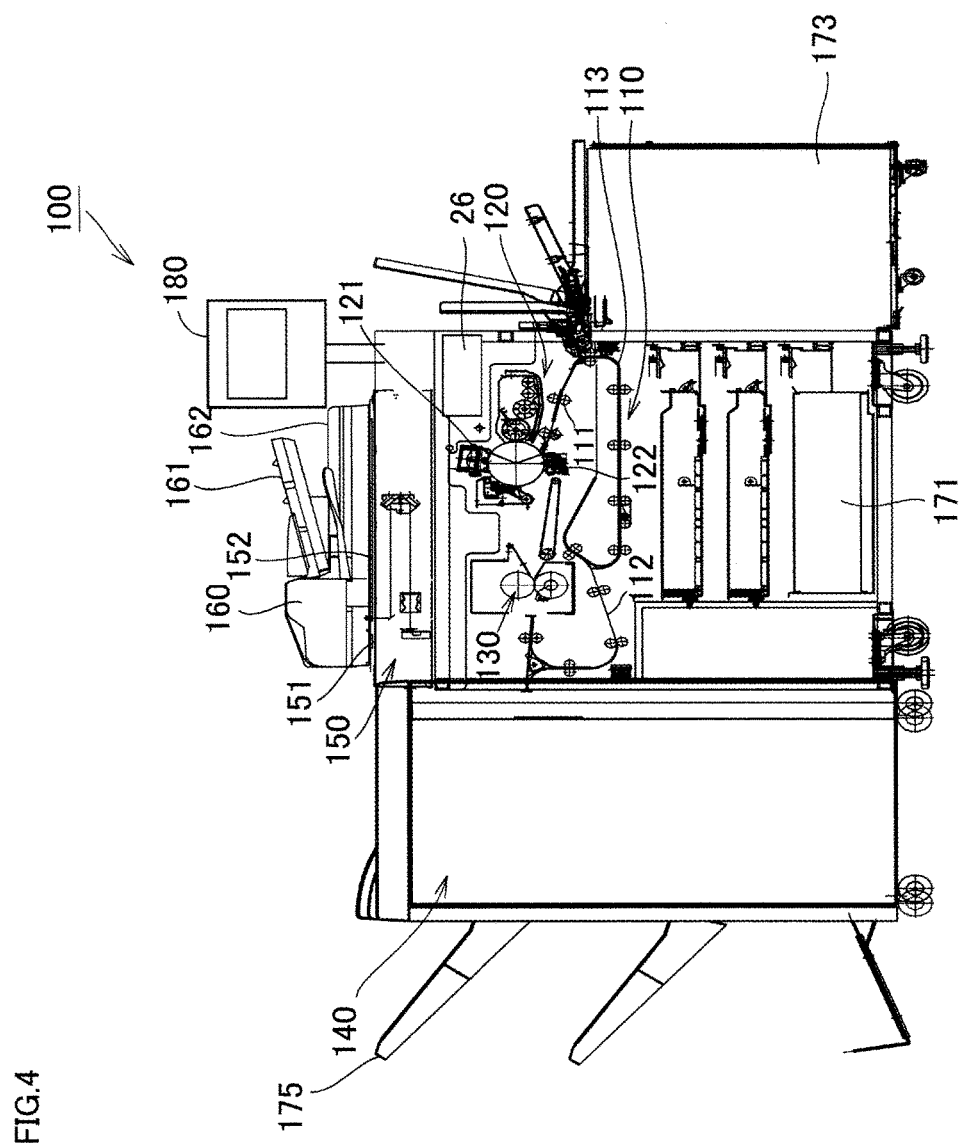
FIG. 4 is a diagram conceptually illustrating a configuration of MFP 100 in the first embodiment of the present invention.

FIG. 4 is a diagram conceptually illustrating a configuration of MFP 100 in the first embodiment of the present invention. FIG. 4 shows the configuration of MFP 100 partially in cross section.

Referring to FIG. 4, MFP 100 mainly includes a paper conveyance unit 110, a toner image forming unit (printer unit) 120, a fixing unit 130, a post-processing unit (post-processor) 140, a scanner unit 150, and a feed-in type ADF (Auto Document Feeder) 160. Three paper-feed trays 171 are arranged at the bottom of MFP 100, and a bulk paper-feed tray 173 is arranged to the right in FIG. 4 of the paper-feed trays 171. In printing, paper conveyance unit 110 conveys paper loaded in paper feed tray 171 or 173 sheet by sheet along a paper conveyance path 113. Paper is conveyed to toner image forming unit 120 through, for example, a paper-feed roller (second paper-feed roller) 111 of paper conveyance unit 110. Toner image forming unit 120 includes an imaging unit 121 including photoconductors and a transfer roller 122. Toner image forming unit 120 transfers a toner image formed on the photoconductor by imaging unit 121 onto paper through transfer roller 122. The paper having a toner image formed thereon is then conveyed to fixing unit 130. Fixing unit 130 mainly includes a heating roller and a pressing roller. Fixing unit 130 conveys the paper with a toner image sandwiched between the heating roller and the pressing roller and meanwhile heats and presses the paper. Fixing unit 130 thus fuses toner adhering on the paper with heat and fixes the toner on paper. The paper having the toner image fixed by fixing unit 130 is conveyed to post-processing unit 140 via a conveyance path 112. The paper is thereafter subjected to necessary post-processing in post-processing unit 140 and then discharged to a paper output tray 175.

Scanner unit 150 is provided above toner image forming unit 20. ADF 160 that can be opened and closed is provided above scanner unit 150. To scan a document with ADF 160 closed, a document is loaded on a paper-feed tray 161 of ADF 160. The document loaded in paper-feed tray 161 is conveyed to a slit glass (slit glass for ADF document scan) 151 in ADF 160. Scanner unit 150 scans the front surface of the document passing through slit glass 151. The document passing through slit glass 151 has its back surface scanned by a not-shown CIS (Contact Image Sensor) in ADF 160, if necessary, and discharged to a paper output tray 162. By scanning an image in this manner, images on both sides of a document can be scanned simultaneously in a pass (with a single feed of paper). To scan a document with ADF 160 opened, scanner unit 150 scans a document placed on a platen glass 152.

(Switching of Keyboards)

A method of switching keyboards appearing on touch panel 201 of operation terminal 200 will now be described.

Figure 5:
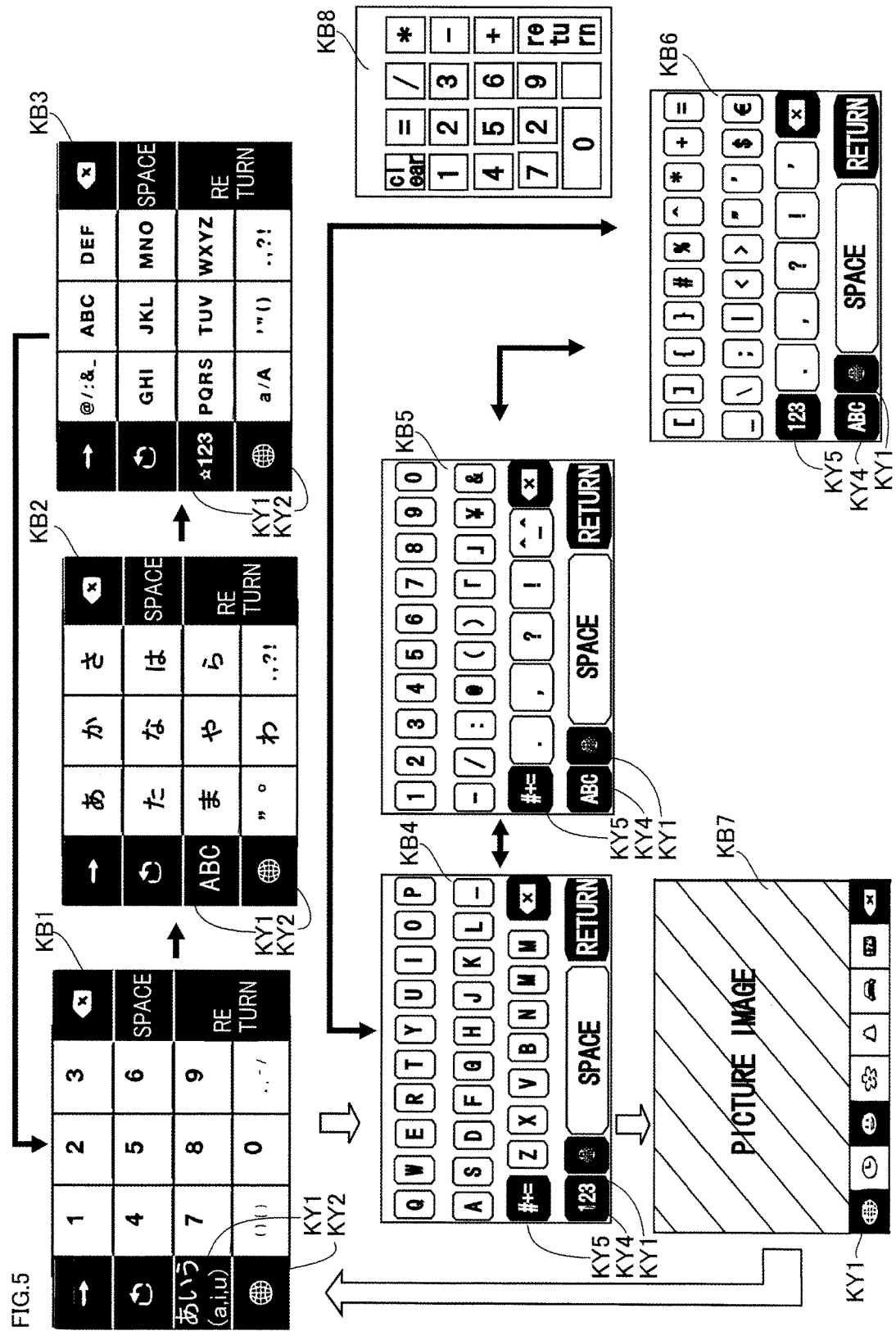
FIG. 5 is a diagram illustrating switching of keyboards appearing on touch panel 201 of operation terminal 200.

FIG. 5 is a diagram illustrating switching of keyboards appearing on touch panel 201 of operation terminal 200.

Referring to FIG. 5, for example, when accepting an operation to activate a keyboard on touch panel 201, operation terminal 200 starts up the application for the keyboard and displays the keyboard on touch panel 201. Operation terminal 200 selectively displays one of a plurality of different keyboards KB1 to KB8 configured with software key groups different from each other in accordance with the user's operation.

Keyboard KB1 is a keyboard for inputting numbers and is mainly configured with a software key group for inputting numbers. Keyboard KB2 is a keyboard for inputting Japanese characters and is mainly configured with a software key group for inputting Japanese characters. Keyboard KB3 is a keyboard for inputting alphabetic characters and is mainly configured with a software key group for inputting alphabetic characters.

When switch key KY1 (the key labeled the Japanese characters "a, i, u") is pressed with keyboard KB1 appearing on touch panel 201, operation terminal 200 switches the keyboard to be displayed on touch panel 201 to keyboard KB2. When switch key KY1 (the key labeled the alphabetic characters "ABC") is pressed with keyboard KB2 appearing on touch panel 201, operation terminal 200 switches the keyboard to be displayed on touch panel 201 to keyboard KB3. When switch key KY1 (the key labeled the numbers "123") is pressed with keyboard KB3 appearing on touch panel 201, operation terminal 200 switches the keyboard to be displayed on touch panel 201 to keyboard KB1.

When switch key KY2 (the key with the Earth icon) is pressed with one of keyboards KB1 to KB3 appearing on touch panel 201, operation terminal 200 switches the keyboard to be displayed on touch panel 201 to one of keyboards KB4 to KB6.

Keyboards KB4 to KB6 are keyboards for inputting Roman letters. Keyboard KB4 is a keyboard for inputting alphabetic characters and is configured with a software key group for mainly inputting alphabetic characters. Keyboard KB5 is a keyboard for inputting numbers and is configured with a software key group for mainly inputting numbers. Keyboard KB6 is a keyboard for inputting symbols and is configured with a software key group for mainly inputting symbols.

When switch key KY4 (the keys labeled the numbers "123") is pressed with keyboard KB4 appearing on touch panel 201, operation terminal 200 switches the keyboard to be displayed on touch panel 201 to keyboard KB5. When switch key KY5 (the key labeled "#+=") is pressed, operation terminal 200 switches the keyboard to be displayed on touch panel 201 to keyboard KB6. When switch key KY4 (the key labeled the alphabetic characters "ABC") is pressed with keyboard KB5 appearing on touch panel 201, operation terminal 200 switches the keyboard to be displayed on touch panel 201 to keyboard KB4. When switch key KY5 (the key labeled "#+=") is pressed, operation terminal 200 switches the keyboard to be displayed on touch panel 201 to keyboard KB6. When switch key KY4 (the key labeled the alphabetic characters "ABC") is pressed with keyboard KB6 appearing on touch panel 201, operation terminal 200 switches the keyboard to be displayed on touch panel 201 to keyboard KB4. When switch key KY5 (the key labeled the numbers "123") is pressed, operation terminal 200 switches the keyboard to be displayed on touch panel 201 to keyboard KB5.

When switch key KY1 is pressed with one of keyboards KB4 to KB6 appearing on touch panel 201, operation terminal 200 switches the keyboard to be displayed on touch panel 201 to keyboard KB7.

Keyboard KB7 is a keyboard for inputting pictograms and is configured with a software key group for mainly inputting pictograms (pictograms are a kind of symbol). The area of keyboard KB7 in which pictograms are displayed is hatched, and the pictograms are not shown. When switch key KY1 is pressed with keyboard KB7 appearing on touch panel 201, operation terminal 200 switches the keyboard to be displayed on touch panel 201 to one of keyboards KB1 to KB3.

When accepting an operation to activate a ten-key pad on touch panel 201, operation terminal 200 starts up an application (an application for ten-key pad) different from applications for keyboards KB1 to KB7 and displays keyboard KB8 on touch panel 201. Keyboard KB8 is a ten-key pad that is a keyboard for inputting numbers and is mainly configured with a software key group for mainly inputting numbers.

(Configuration of Setting Screen)

A configuration of a setting screen appearing on touch panel 181 of operation panel 180 will now be described.

Figure 6:
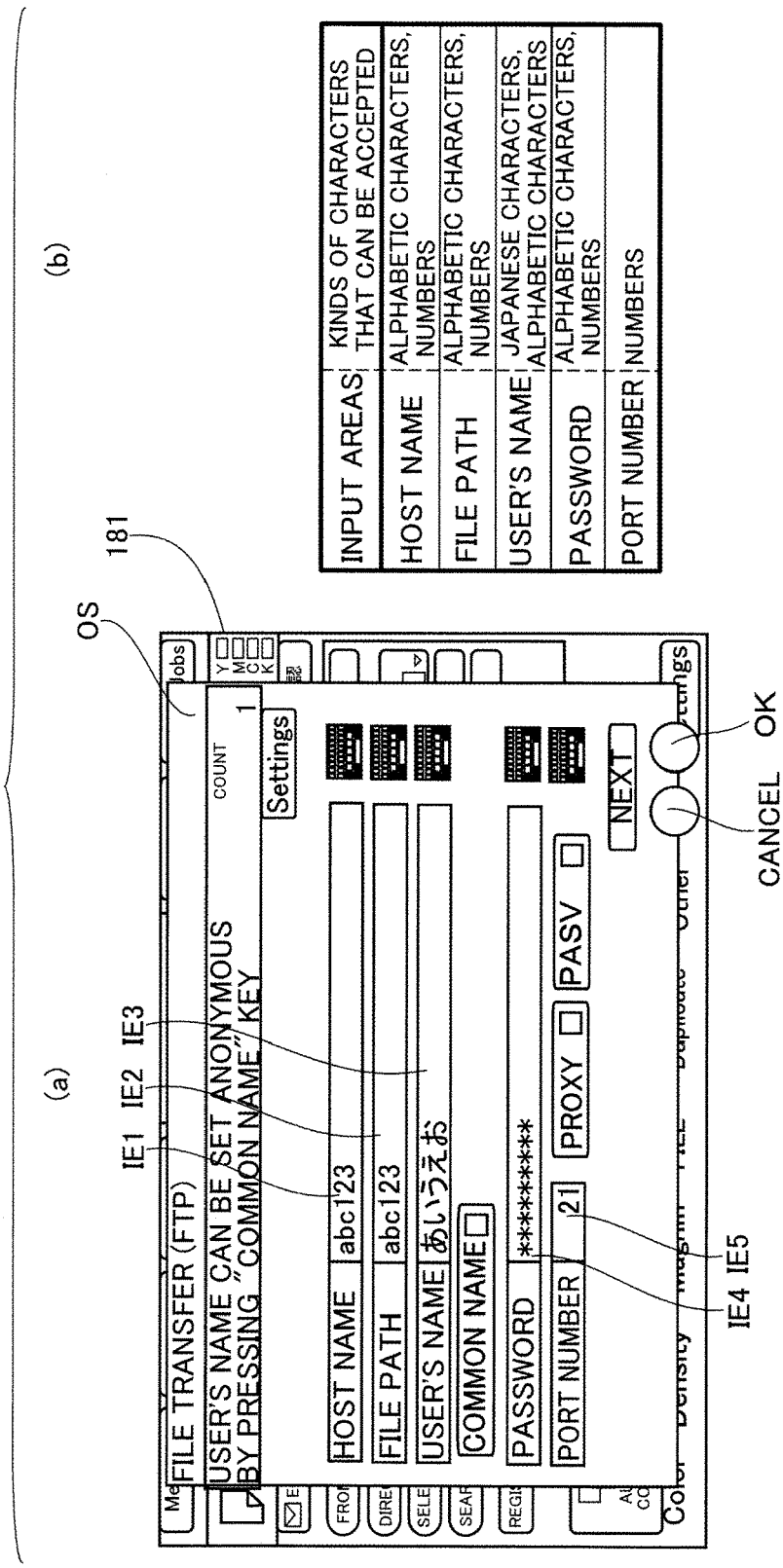
FIG. 6 is a diagram schematically showing a setting screen OS appearing on touch panel 181 of operation panel 180.

FIG. 6 is a diagram schematically showing a setting screen OS appearing on touch panel 181 of operation panel 180, in which (a) schematically shows a setting screen OS and (b) is a table showing the relationship between input areas IE1 to IE5 included in the setting screen OS and the kinds of characters that can be accepted in the input areas.

Referring to FIG. 6(a), the setting screen OS is a popup screen for making a variety of settings for file transmission (FTP). The setting screen OS includes a plurality of input areas IE1 to IE5. Input area IE1 is an area for inputting a host name (file destination). Input area IE2 is an area for inputting a file path (the location where a file is saved). Input area IE3 is an area for inputting a user's name (file sender). Input area IE4 is an area for inputting a password (the entered password is shown by *). Input area IE5 is an area for inputting a port number (the port number of a port for use in file transfer). Each of input areas IE1 to IE5 can accept an input through the software keys included in one of a plurality of keyboards that can be displayed on touch panel 201 of operation terminal 200.

Referring to FIG. 6(b), the kind of characters of which inputs can be accepted is specified for each of input areas IE1 to IE5. If unacceptable characters or symbols are input in any one of input areas IE1 to IE5, the inputs are not reflected in that input area. Specifically, input area IE1 for host name, input area IE2 for file path, and input area IE4 for password are areas that can accept only inputs of alphabetic characters and numbers and cannot accept inputs of other characters (for example, Japanese characters) and symbols. Input area IE3 for user's name is an area that can accept only inputs of Japanese characters and alphabetic characters and cannot accept inputs of other characters (for example, numbers) and symbols. Input area IE5 for numbers is an area that can accept only inputs of numbers and cannot accept inputs of other characters (for example, alphabetic characters, Japanese characters) and symbols.

(Operation with Setting Screen Displayed)

The operation of MFP 100 and operation terminal 200 with a setting screen appearing on touch panel 181 of operation panel 180 will now be described.

The user with operation terminal 200 in hand approaches operation panel 180 and presses the "work with smartphone" key 182a (FIG. 1). Accepting the press on the "work with smartphone" key 182a, MFP 100 finds operation terminal 200 ready for communication with MFP 100 and starts communication with operation terminal 200. When communication with operation terminal 200 is started, MFP 100 may display a message on touch panel 181 or 201, saying "Communication with Operation Terminal has been started. You can make an input with Operation Terminal" to indicate that communication with the operation terminal has been started.

Figure 7:
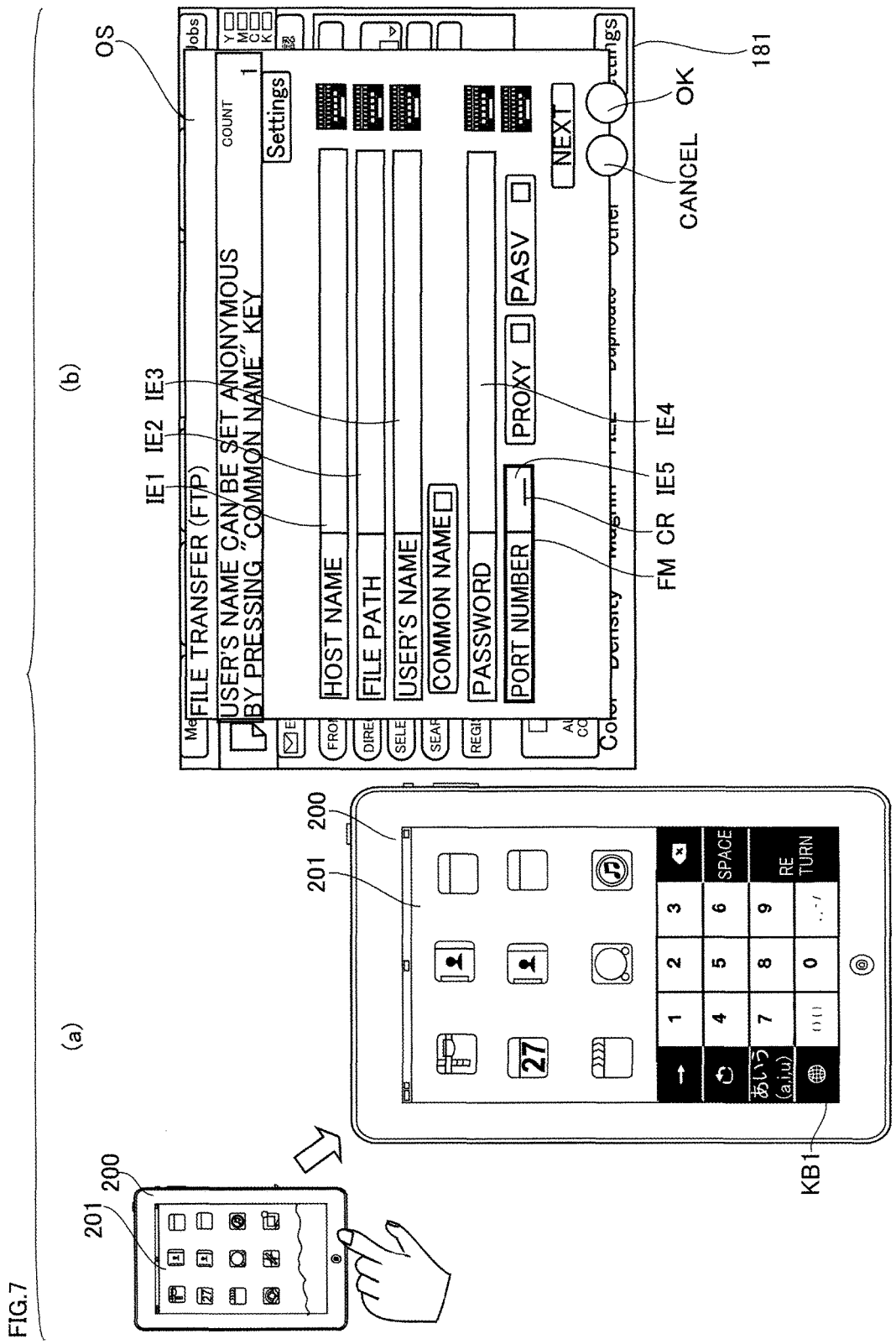
FIG. 7 is a diagram illustrating operation of MFP 100 and operation terminal 200 in a case where keyboard KB1 appears on touch panel 201 in the first embodiment of the present invention.

FIG. 7 is a diagram illustrating operation of MFP 100 and operation terminal 200 in a case where keyboard KB1 appears on touch panel 201 in the first embodiment of the present invention.

Referring to FIG. 7, when communication between MFP 100 and operation terminal 200 is started, the user operates operation panel 180 and allows the setting screen OS to appear on touch panel 181 as shown in FIG. 7(b). Meanwhile, the user operates operation terminal 200 to display keyboard KB1 (ten-key pad) for inputting numbers on touch panel 201, as shown in FIG. 7(a).

Operation terminal 200 may decide the type of the keyboard to be displayed on touch panel 201 in accordance with the user's operation as described above or may always display a particular type of keyboard.

When keyboard KB1 appears, operation terminal 200 transmits the type of the appearing keyboard to MFP 100. The type of keyboard refers to the type of software key group that constitutes the keyboard. The type of keyboard may be the one that shows the kind of software keys that constitute the keyboard, such as "for inputting alphabetic characters" or "for inputting Japanese characters," or the ID (Identification) of the keyboard, or the one that shows the function of each of a plurality of software keys that constitute the keyboard.

When the setting screen OS appears on touch panel 181, MFP 100 acquires the type of keyboard from operation terminal 200 and decides an input area that accepts an input through the keyboard appearing on touch panel 201, from among input areas IE1 to IE5, based on the acquired type.

The input area that accepts an input through the keyboard appearing on touch panel 201 of operation terminal 200 may hereinafter be referred to as an input accepting area. MFP 100 can switch each input area included in the setting screen between two states, namely, a selected state that is a state of being the input accepting area and a not-selected state that is a state of not being the input accepting area.

Specifically, MFP 100 decides an input area suitable for the software key group that constitutes the acquired type of keyboard (suitable for the acquired type of keyboard), as an input accepting area, from among input areas IE1 to IE5 included in the setting screen OS. Here, MFP 100 acquires the type of keyboard KB1 for inputting numbers and thus accepts input area IE5 for "port number" that can accept number inputs, as an input accepting area, as shown in FIG. 7(b). MFP 100 then gives a notice that input area IE5 is in the selected state. MFP 100 may give the notice of the input area in the selected state, for example, by displaying a cursor CR in the input area in the selected state or by surrounding the input area in the selected state with a frame FM.

When the user switches the keyboard appearing on touch panel 201 to another type of keyboard, MFP 100 may acquire the type of the switched keyboard from operation terminal 200 and may control operation panel 180 such that an input into the input area suitable for the acquired type of keyboard is accepted (such that focus is switched to the input area suitable for the acquired type of keyboard).

Figure 8:
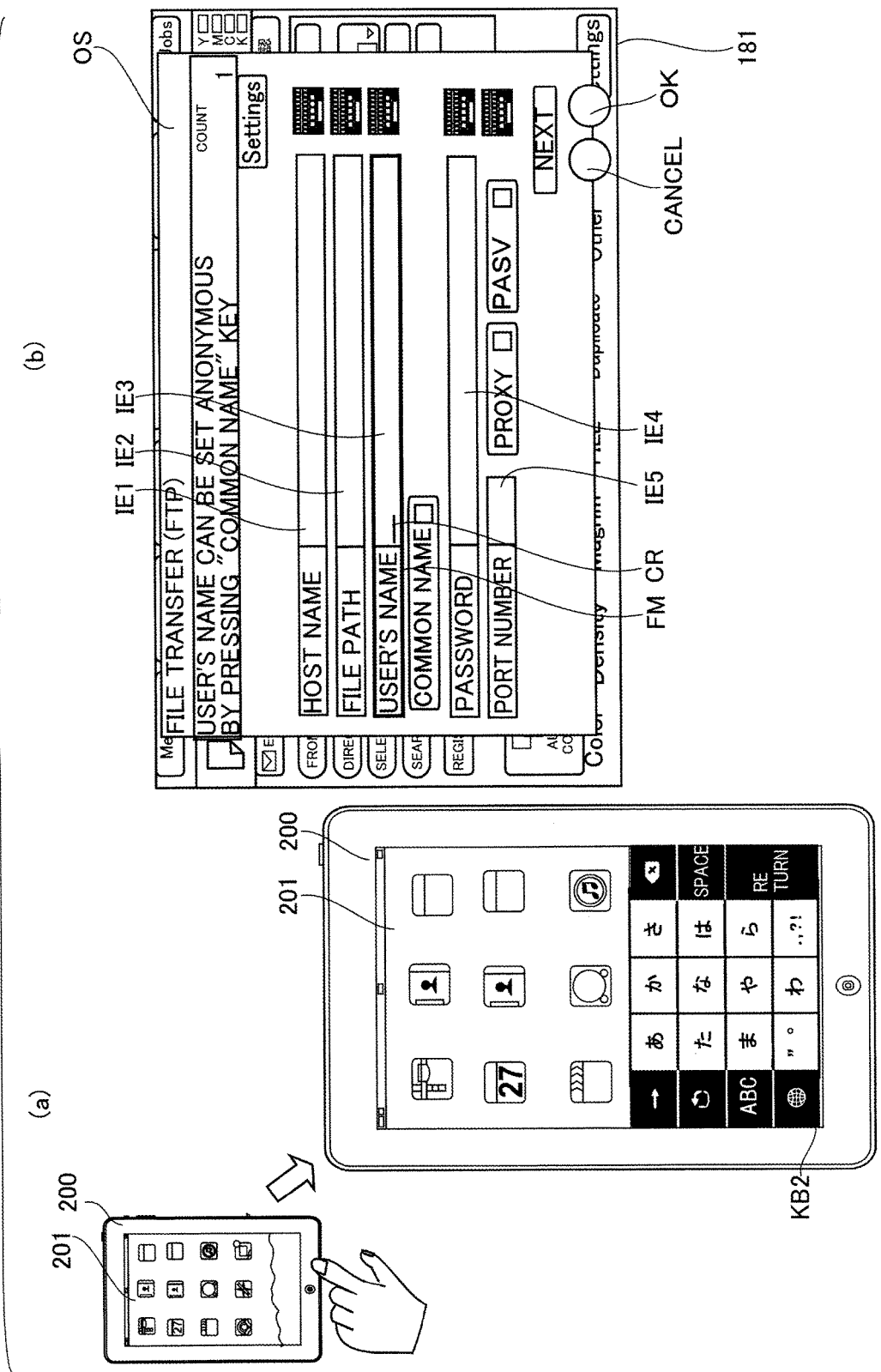
FIG. 8 is a diagram illustrating operation of MFP 100 and operation terminal 200 in a case where keyboard KB2 appears on touch panel 201 in the first embodiment of the present invention.

FIG. 8 is a diagram illustrating operation of MFP 100 and operation terminal 200 in a case where keyboard KB2 appears on touch panel 201 in the first embodiment of the present invention.

Referring to FIG. 8(a), when keyboard KB2 for inputting Japanese characters appears, operation terminal 200 transmits the type of the appearing keyboard to MFP 100.

MFP 100 acquires the type of keyboard from operation terminal 200 and then decides input area IE3 for "the user's name" that can accept inputs of Japanese characters, as an input accepting area, as shown in FIG. 8(b). MFP 100 then gives a notice that input area IE3 is in the selected state.

Figure 9:
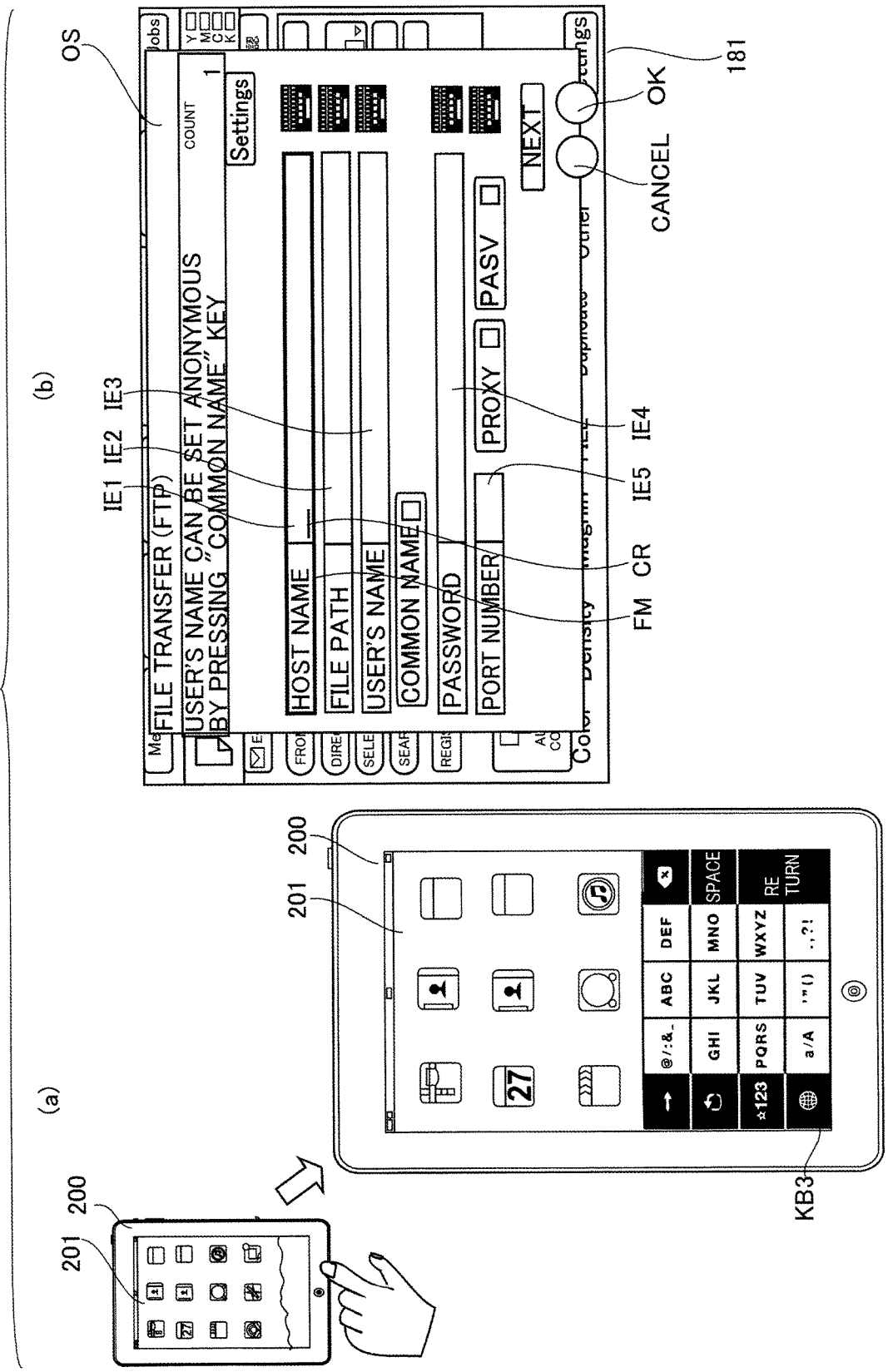
FIG. 9 is a diagram illustrating operation of MFP 100 and operation terminal 200 in a case where keyboard KB3 appears on touch panel 201 in the first embodiment of the present invention.

FIG. 9 is a diagram illustrating operation of MFP 100 and operation terminal 200 in a case where keyboard KB3 appears on touch panel 201 in the first embodiment of the present invention.

Referring to FIG. 9(a), when keyboard KB3 for inputting alphabetic characters appears, operation terminal 200 transmits the type of the appearing keyboard to MFP 100.

In a case where there are a plurality of input areas that can accept inputs through the software keys included in the acquired type of keyboard, MFP 100 decides the input area displayed at the top of these input areas, as an input accepting area.

More specifically, MFP 100 decides input area IE1 at the top of input areas IE1, IE2, IE3, and IE4 that can accept inputs of alphabetic characters, as an input accepting area, as shown in FIG. 9(b).

Figure 10:
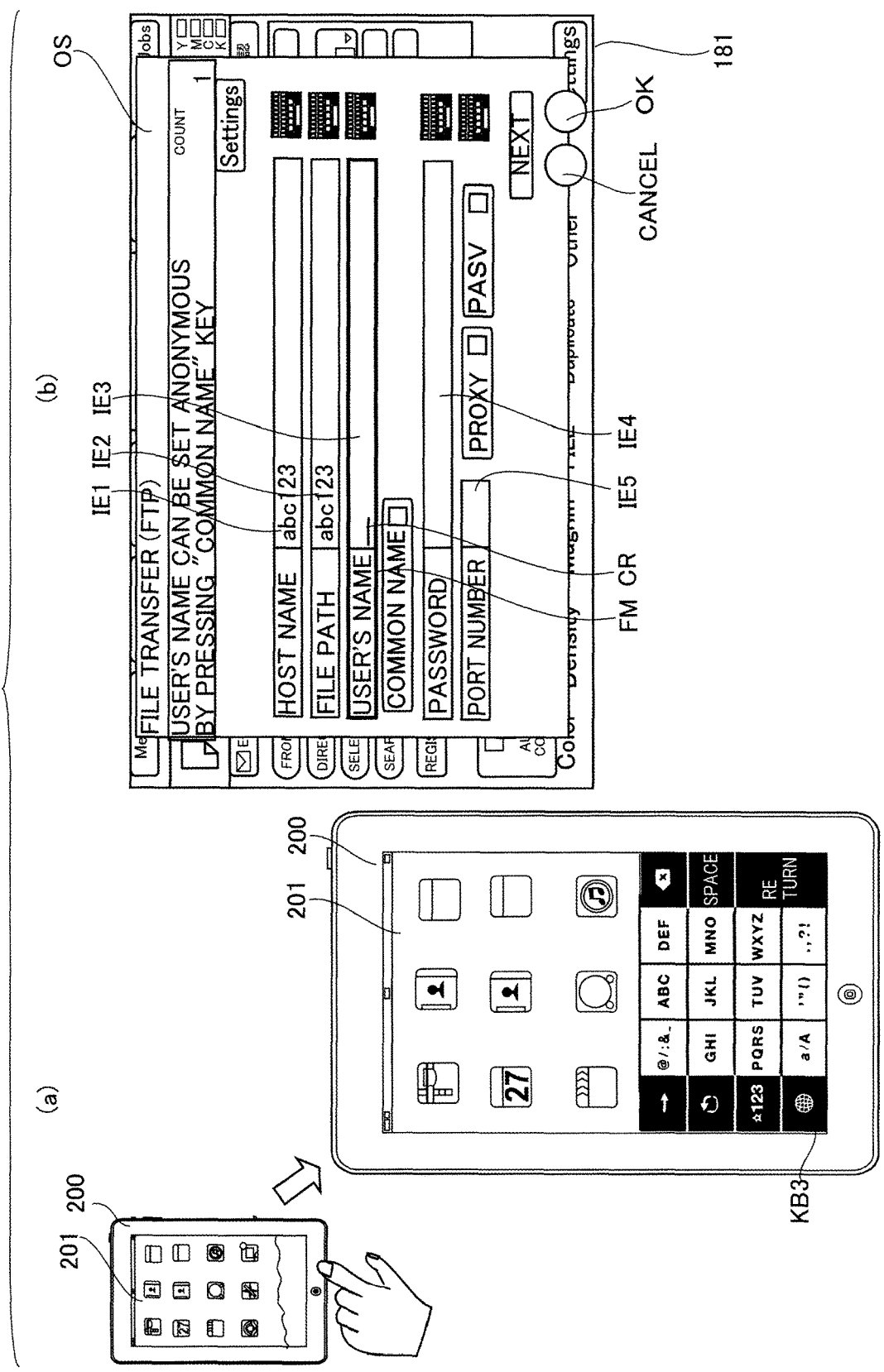
FIG. 10 is a diagram illustrating operation of MFP 100 and operation terminal 200 in a case where keyboard KB3 appears on touch panel 201 in a state in which inputs have already been accepted in input areas IE1 and IE2 in the first embodiment of the present invention.

FIG. 10 a diagram illustrating operation of MFP 100 and operation terminal 200 in a case where keyboard KB3 appears on touch panel 201 in a state in which inputs have already been accepted in input areas IE1 and IE2 in the first embodiment of the present invention.

Referring to FIG. 10(a), MFP 100 has already accepted inputs into input areas IE1 and IE2. Operation terminal 200 displays keyboard KB3 for inputting alphabetic characters and then transmits the type of the displayed keyboard to MFP 100.

In the case where there are a plurality of input areas than can accept inputs through the software keys included in the acquired type of keyboard, when there exists an input area that has already accepted an input, among these input areas, MFP 100 gives a high priority to the input area displayed at the top of input areas that has not yet accepted an input, from among these input areas, in deciding an input accepting area. The order of priority can be set as desired. However, it is preferable that the input area located closer to the top in the screen should be given a higher priority.

Specifically, MFP 100 decides input area IE3 displayed at the top of the input areas that has not yet accepted an input, as an input accepting area, among input areas IE1, IE2, IE3, and IE4 that can accept inputs of alphabetic characters, as shown in FIG. 10(b).

Figure 11:
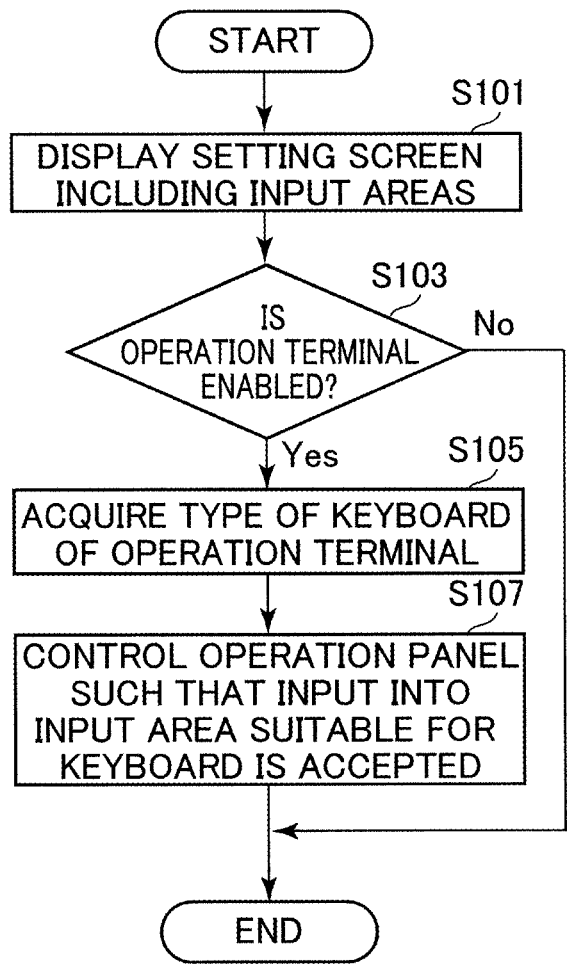
FIG. 11 is a flowchart showing operation of MFP 100 in the first embodiment of the present invention.

FIG. 11 is a flowchart showing operation of MFP 100 in the first embodiment of the present invention.

Referring to FIG. 11, when communication with operation terminal 200 is started, control unit 10 of MFP 100 displays a setting screen including input areas on touch panel 181, for example, in accordance with the operation accepted from the user (S101), and determines whether operation terminal 200 is enabled (whether MFP 100 can communicate with operation terminal 200) (S103).

In step S103, if it is determined that operation terminal 200 is disabled (No in S103), the process of control unit 10 ends.

In step S103, if it is determined that operation terminal 200 is enabled (Yes in S103), control unit 10 acquires the type of keyboard appearing on touch panel 201 from operation terminal 200 (S105). Control unit 10 then controls operation panel 180 such that an input into the input area suitable for the keyboard (input accepting area) is accepted (S107). The process then ends.

Figure 12:
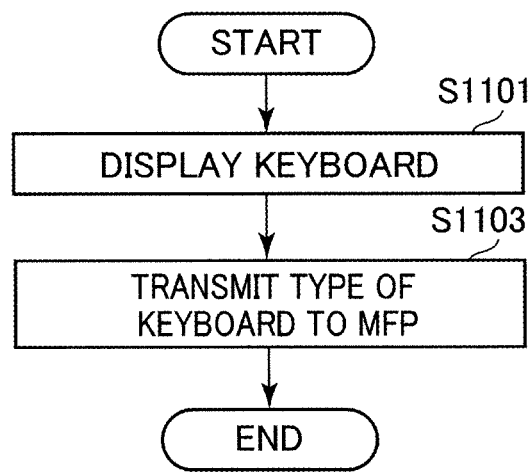
FIG. 12 is a flowchart showing operation of operation terminal 200 in the first embodiment of the present invention.

FIG. 12 is a flowchart showing operation of operation terminal 200 in the first embodiment of the present invention.

Referring to FIG. 12, when communication with MFP 100 is started, control unit 210 of operational terminal 200 displays a keyboard on touch panel 201, for example, in accordance with the operation accepted from the user (S1101). Control unit 210 then transmits the type of the displayed keyboard to MFP 100 (S1103). The process then ends.

The processes other than those described above, the configuration of the image forming system, and the like are the same as those in the first embodiment. The same parts are denoted with the same reference characters and a description thereof will not be repeated.

The present embodiment can provide an information processing apparatus with the ease of operation on an operation terminal.

According to the present embodiment, when operation terminal 200 is connected to MFP 100 to serve as an input unit for MFP 100, it is automatically decided which of the input areas appearing on touch panel 181 on the MFP 100 side should accept an input from operation terminal 200, in accordance with an input from operation terminal 200 (based on the type of keyboard appearing on operation terminal 200). The user only has to make an operation of allowing the keyboard to appear on operation terminal 100 thereby making an input into the optimum input area automatically. Accordingly, the user does not have to switch the keyboards or the input accepting areas in order to make an input into the input area suitable for the keyboard, thereby simplifying the operation on the operation terminal.

[Second Embodiment]

Figure 13:
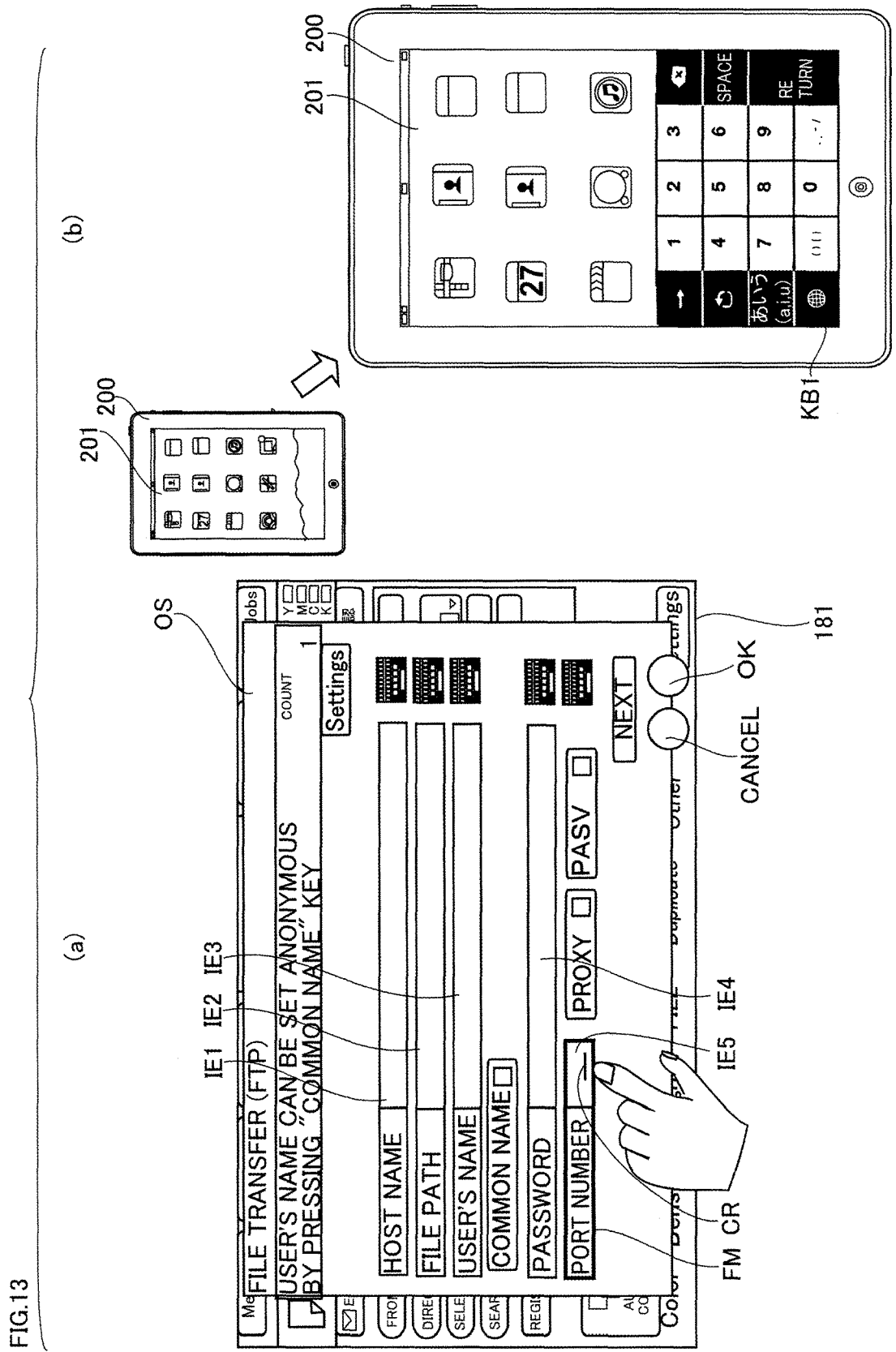
FIG. 13 is a diagram illustrating operation of MFP 100 and operation terminal 200 in a state in which selection of input area IE5 is accepted on touch panel 181 in a second embodiment of the present invention.

FIG. 13 is a diagram illustrating operation of MFP 100 and operation terminal 200 in a state in which selection of input area IE5 is accepted on touch panel 181 in a second embodiment of the present invention.

Referring to FIG. 13(a), when communication between MFP 100 and operation terminal 200 is started, the user operates operation panel 180 to allow the setting screen OS to appear on touch panel 181 and selects any given input area (here, input area IE5) from among input areas IE1 to IE5.

MFP 100 accepts the selection of the input area and decides the input area as an input accepting area. MFP 100 then transmits, to operation terminal 200, a request for displaying a keyboard that includes software keys allowing input into the input accepting area (the keyboard of the type suitable for the selected input accepting area) on touch panel 201.

Here, input area IE5 that can accept only number inputs is the input accepting area. MFP 100 therefore requests that keyboard KB1 for inputting numbers should be displayed.

Upon receiving the request from MFP 100, operation terminal 200 displays keyboard KB1 on touch panel 201 in accordance with the request, as shown in FIG. 13(b).

If the request from MFP 100 is received in a state in which a different type of keyboard appears on touch panel 201, operation terminal 200 switches the keyboard to be displayed on touch panel 201 to the keyboard of the requested type.

Figure 14:
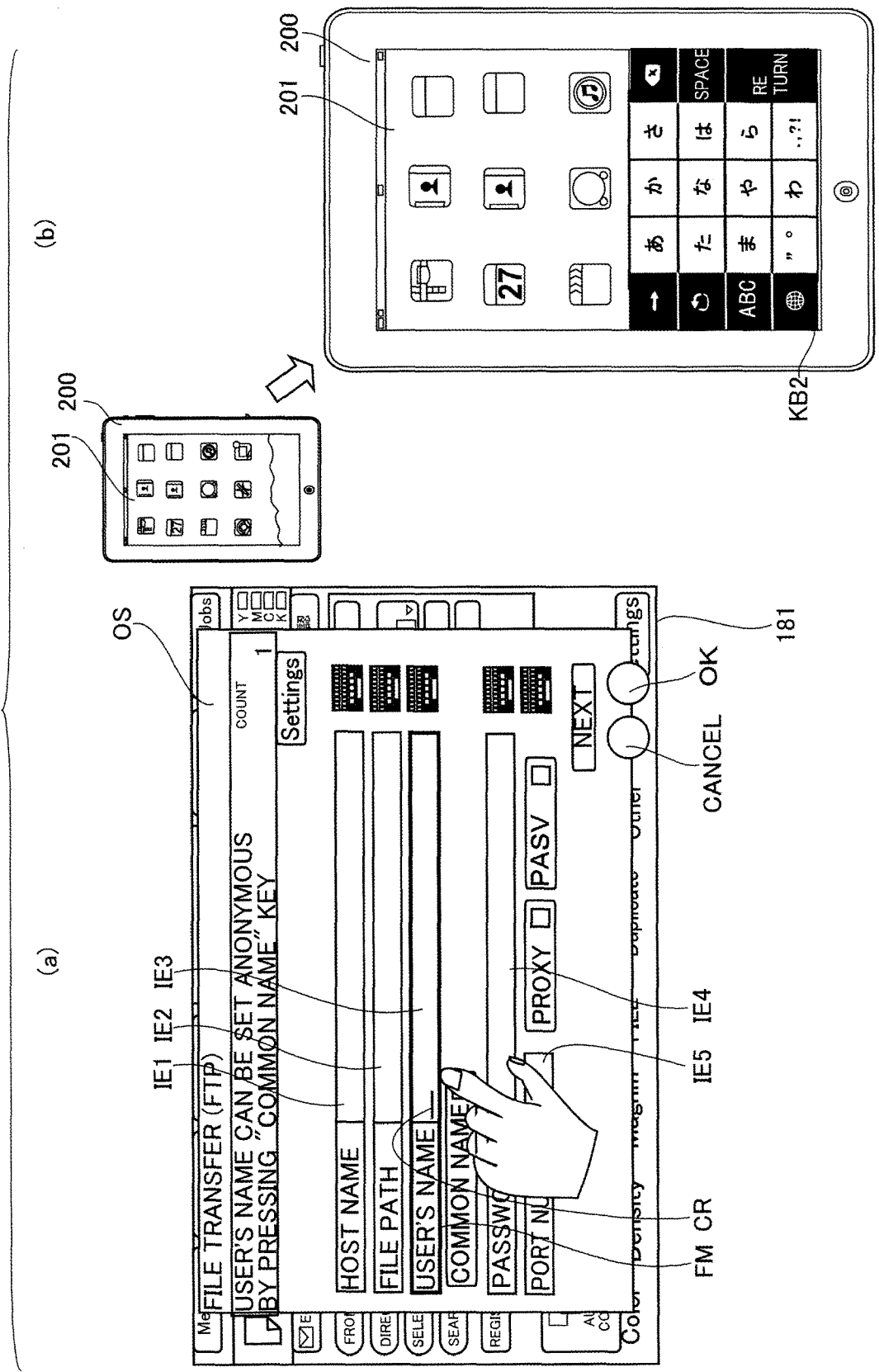
FIG. 14 is a diagram illustrating operation of MFP 100 and operation terminal 200 in a case where selection of input area IE1 is accepted on touch panel 181 in the second embodiment of the present invention.

FIG. 14 is a diagram illustrating operation of MFP 100 and operation terminal 200 in a case where selection of input area IE1 is accepted on touch panel 181 in the second embodiment of the present invention.

Referring to FIG. 14(a), MFP 100 accepts the selection of input area IE3 that can accept inputs of Japanese characters and alphabetic characters and then decides that input area as an input accepting area. In this case, MFP 100 transmits a request for displaying the keyboard for inputting Japanese characters or alphabetic characters (here, keyboard KB2) to operation terminal 200.

Upon receiving the request from MFP 100, operation terminal 200 displays keyboard KB2 on touch panel 201 in accordance with the request, as shown in FIG. 14(b).

Figure 15:
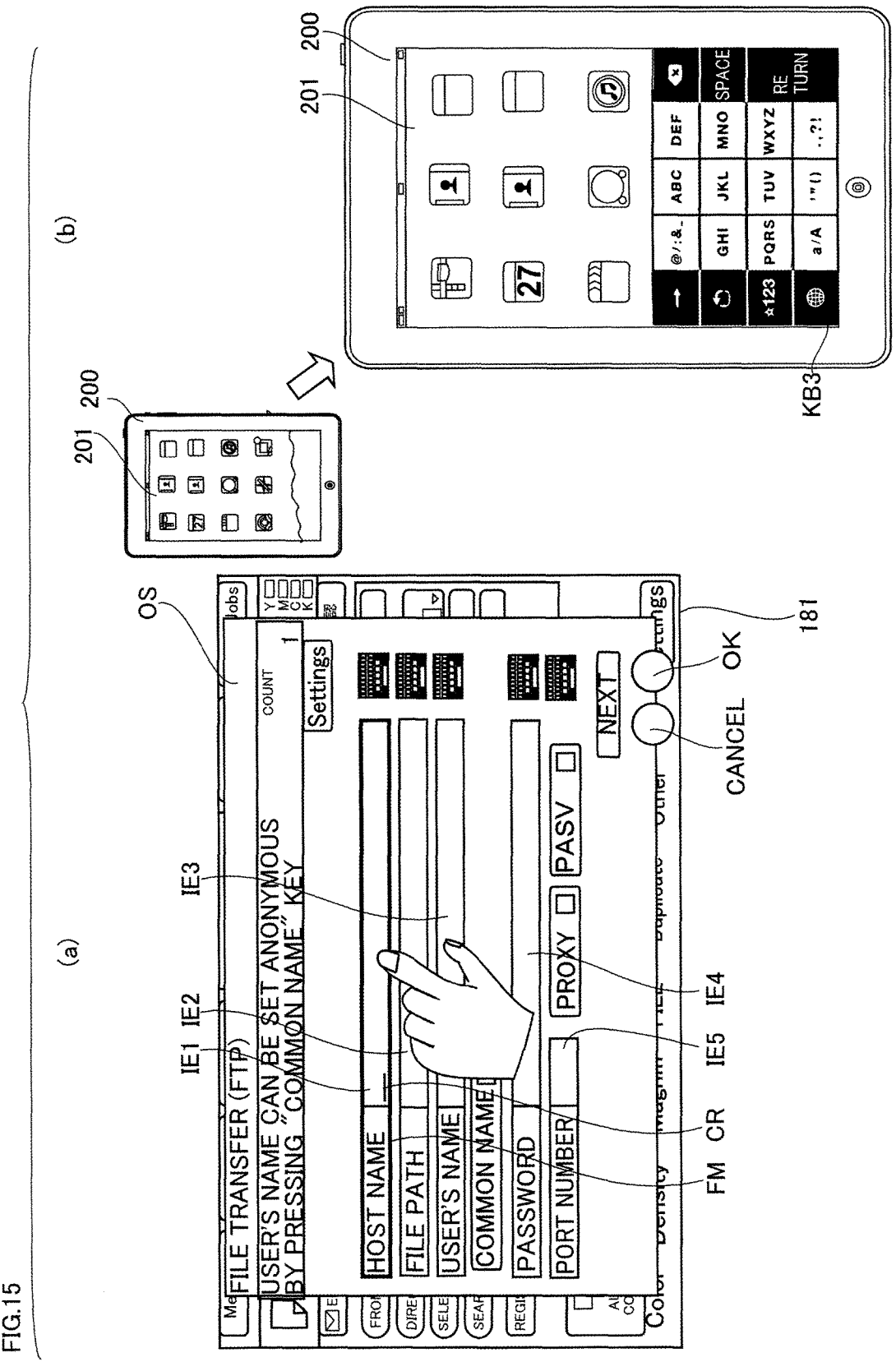
FIG. 15 is a diagram illustrating operation of MFP 100 and operation terminal 200 in a case where selection of input area IE1 is accepted on touch panel 181 in the second embodiment of the present invention.

FIG. 15 is a diagram illustrating operation of MFP 100 and operation terminal 200 in a case where selection of input area IE1 is accepted on touch panel 181 in the second embodiment of the present invention.

Referring to FIG. 15(a), MFP 100 accepts the selection of input area IE1 that can accept inputs of alphabetic characters and numbers and then decides the input area as an input accepting area. MFP 100 then transmits a request for displaying the keyboard for inputting alphabetic characters or numbers (here, keyboard KB3) to operation terminal 200.

Upon receiving the request from MFP 100, operation terminal 200 displays keyboard KB1 on touch panel 201 in accordance with the request, as shown in FIG. 15(b).

Figure 16:
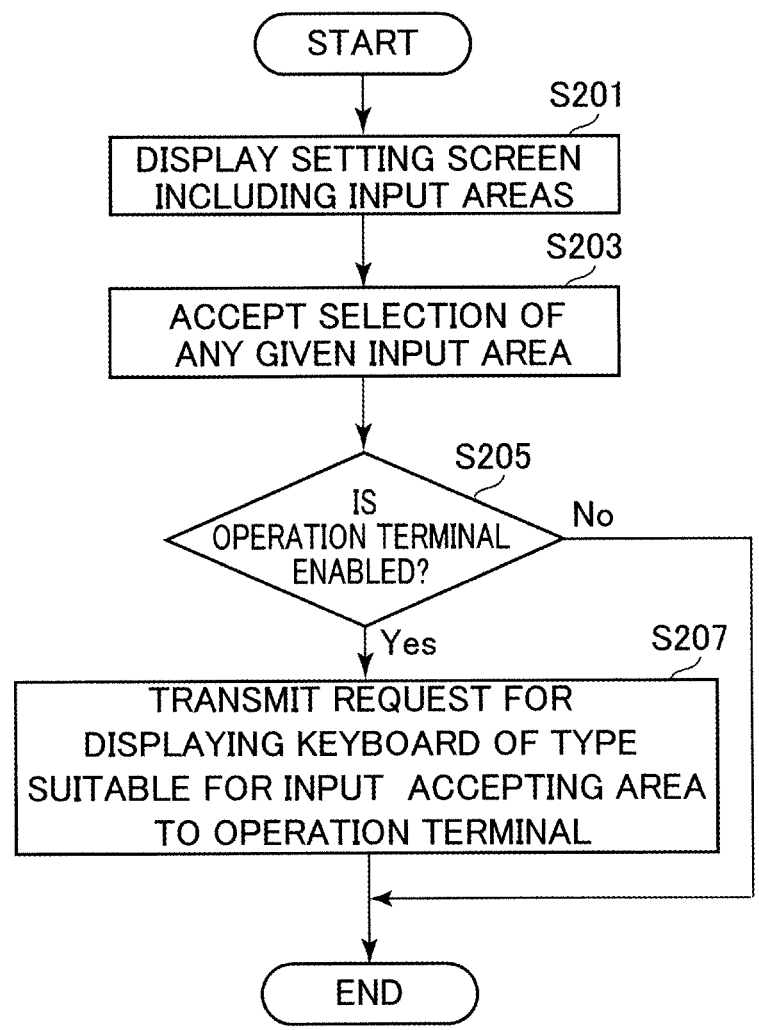
FIG. 16 is a flowchart showing operation of MFP 100 in the second embodiment of the present invention.

FIG. 16 is a flowchart showing operation of MFP 100 in the second embodiment of the present invention.

Referring to FIG. 16, when commination with operation terminal 200 is started, control unit 10 of MFP 100 displays a setting screen including input areas on touch panel 181, for example, in accordance with the operation accepted from the user (S201) and accepts the selection of any given input area (S203). Control unit 10 determines whether operation terminal 200 is enabled (S205).

In step S205, if it is determined that operation terminal 200 is disabled (No in S205), the process of control unit 10 ends.

In step S205, if it is determined that operation terminal 200 is enabled (Yes in S205), control unit 10 decides the selected input area as an input accepting area and transmits, to operation terminal 200, a request for displaying the keyboard of the type suitable for the input accepting area (S207). The process then ends.

Figure 17:
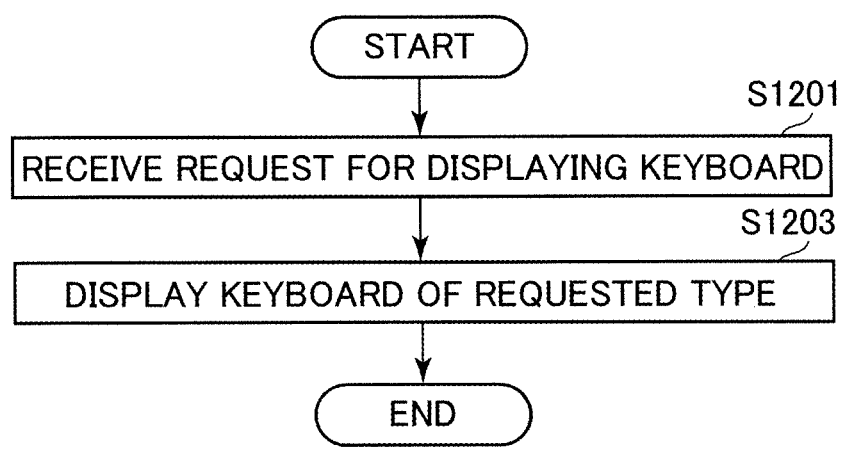
FIG. 17 is a flowchart showing operation of operation terminal 200 in the second embodiment of the present invention.

FIG. 17 is a flowchart showing operation of operation terminal 200 in the second embodiment of the present invention.

Referring to FIG. 17, when communication with MFP 100 is started, control unit 210 of operational terminal 200 receives the request for displaying the keyboard (S1201). Control unit 210 then displays the keyboard of the requested type on touch panel 201 (S1203). The process then ends.

The processes other than those described above, the configuration of the image forming system, and the like are the same as those in the first embodiment. The same parts are denoted with the same reference characters and a description thereof will not be repeated.

According to the present embodiment, when the selection of any given input area from among the input areas in the setting screen is accepted, MFP 100 transmits an instruction (request) for automatically displaying an input screen in accordance with the selected input area. The user only has to select any given input area on the MFP 100 side to display the keyboard suitable for the selected input area on operation terminal 200. Accordingly, the user does not have to switch the keyboards or the input accepting areas in order to make an input into the input area suitable for the keyboard, thereby simplifying the operation on the operation terminal.

[Third Embodiment]

The present embodiment is a combination of operations of MFP 100 and operation terminal 200 in the first and second embodiments.

Figure 18:
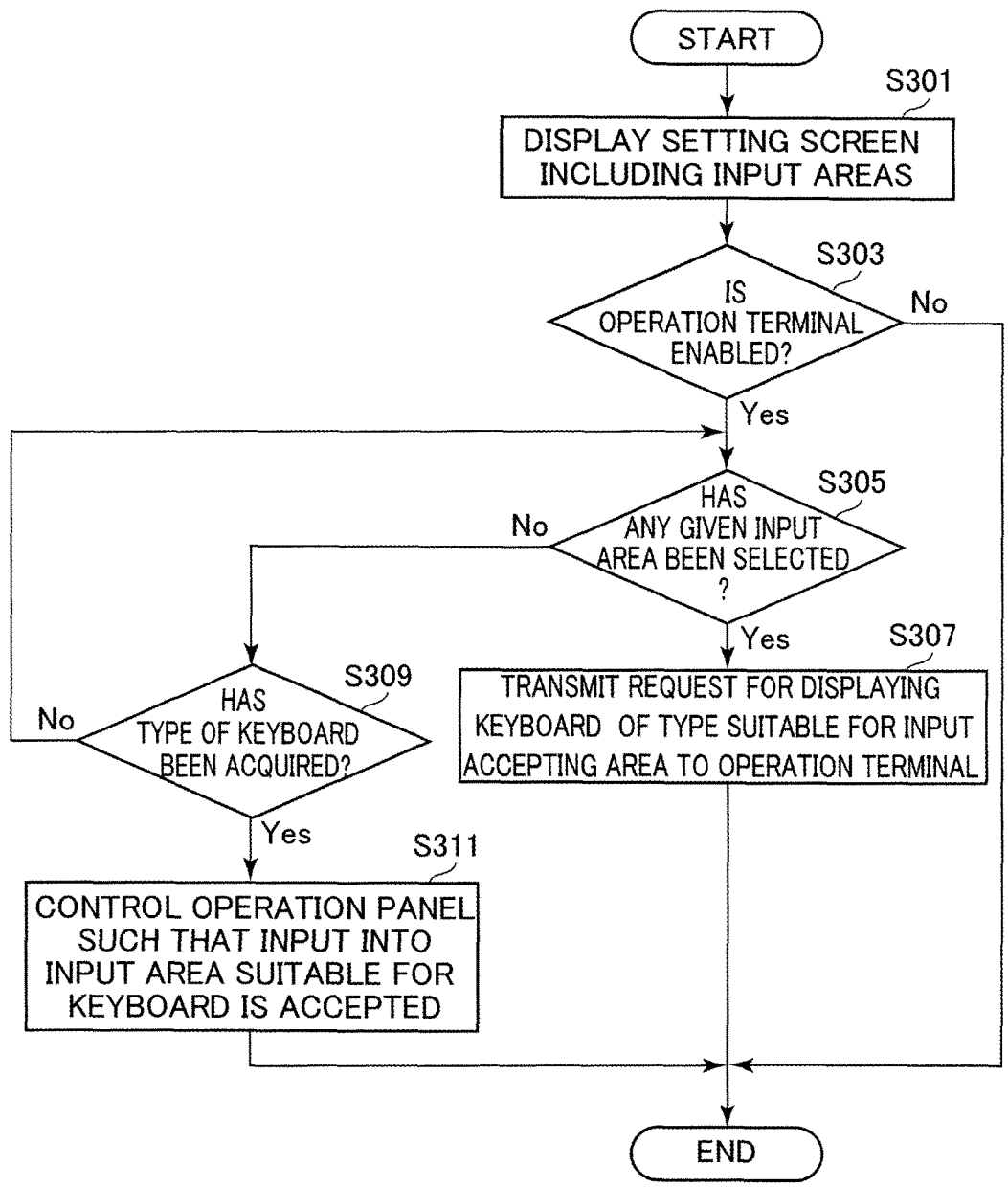
FIG. 18 is a flowchart showing operation of MFP 100 in a third embodiment of the present invention.

FIG. 18 is a flowchart showing operation of MFP 100 in a third embodiment of the present invention.

Referring to FIG. 18, when communication with operation terminal 200 is started, control unit 10 of MFP 100 displays a setting screen including input areas on touch panel 181, for example, in accordance with the operation accepted from the user (S301) and determines whether operation terminal 200 is enabled (S303).

In step S303, if it is determined that operation terminal 200 is disabled (No in S303), the process of control unit 10 ends.

In step S303, if it is determined that operation terminal 200 is enabled (Yes in S303), control unit 10 determines whether the selection of any given input area included in the setting screen has been accepted (S305).

In step S305, if it is determined that the selection of any given input area included in the setting screen has been accepted (Yes in S305), control unit 10 decides the selected input area as an input accepting area and transmits, to operation terminal 200, a request for displaying the keyboard of the type suitable for the input accepting area (S307). The process then ends.

In step S305, if it is determined that the selection of any given input area included in the setting screen has not been accepted (No in S305), control unit 10 determines whether the type of keyboard has been acquired from operation terminal 200 (S309).

In step S309, if it is determined that the type of keyboard has not been acquired from operation terminal 200 (No in S309), the process of control unit 10 proceeds to step S305.

In step S309, if it is determined that the type of keyboard has been acquired from operation terminal 200 (Yes in S309), control unit 10 controls operation panel 180 such that the input area suitable for the acquired type of keyboard (input accepting area) is accepted (S311). The process then ends.

Figure 19:
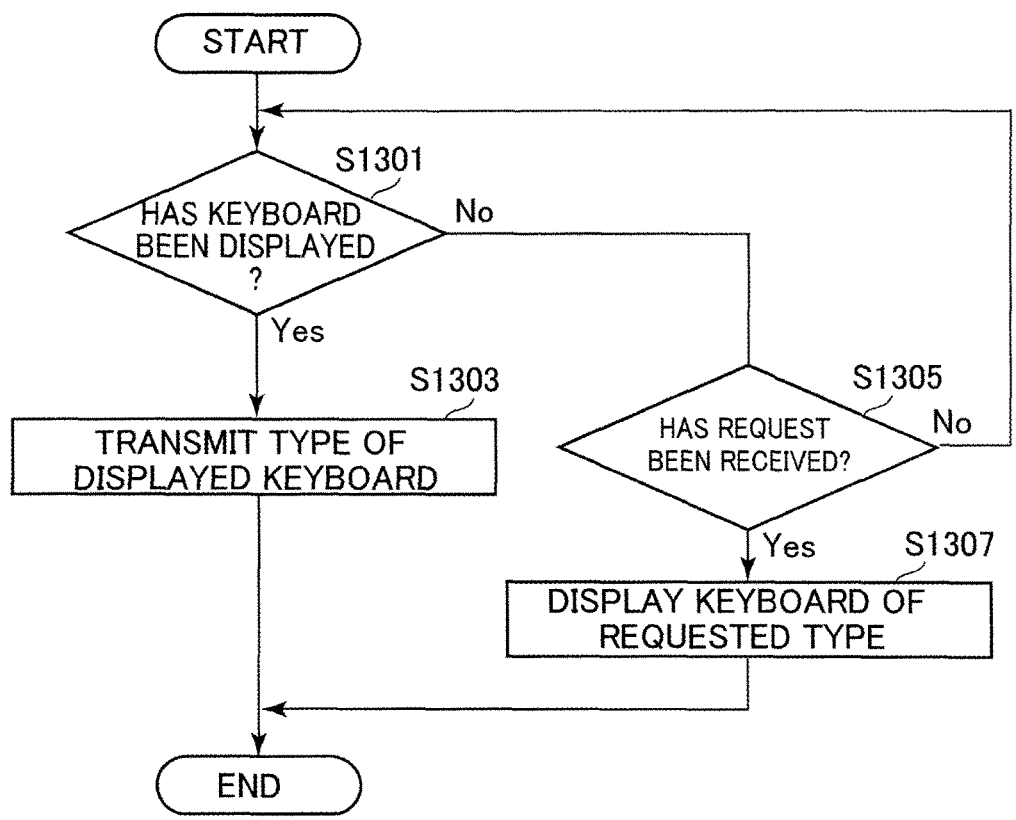
FIG. 19 is a flowchart showing operation of operation terminal 200 in the third embodiment of the present invention.

FIG. 19 is a flowchart showing operation of operation terminal 200 in the third embodiment of the present invention.

Referring to FIG. 19, when communication with MFP 100 is started, control unit 210 of operation terminal 200 determines whether a keyboard has been displayed on touch panel 201 (S1301).

In step S1301, if it is determined that a keyboard has been displayed on touch panel 201 (Yes in S1301), control unit 210 transmits the type of the displayed keyboard to MFP 100 (S1303). The process then ends.

In step S1301, if it is determined that a keyboard has not been displayed on touch panel 201 (No in S1301), control unit 210 determines whether a request for displaying a keyboard has been received (S1305).

In step S1305, if it is determined that a request for displaying a keyboard has not been received (No in S1305), the process of control unit 210 proceeds to step S1301.

In step S1305, if it is determined that a request for displaying a keyboard has been received (Yes in S1305), control unit 210 displays the keyboard of the requested type on touch panel 201 (S1307). The process then ends.

The processes other than those described above, the configuration of the image forming system, and the like are the same as those in the first embodiment. The same parts are denoted with the same reference characters and a description thereof will not be repeated.

According to the present embodiment, when the user displays a keyboard on touch panel 201, MFP 100 decides an input accepting area based on the type of that keyboard. When the user selects any given input area from among the input areas in the setting screen, MFP 100 requests operation terminal 200 to display a keyboard that includes software keys allowing input into the selected input area. Accordingly, the user does not have to switch the keyboards or the input accepting areas in order to make an input into an input area suitable for the keyboard, thereby simplifying the operation on the operation terminal.

[Fourth Embodiment]

Figure 20:
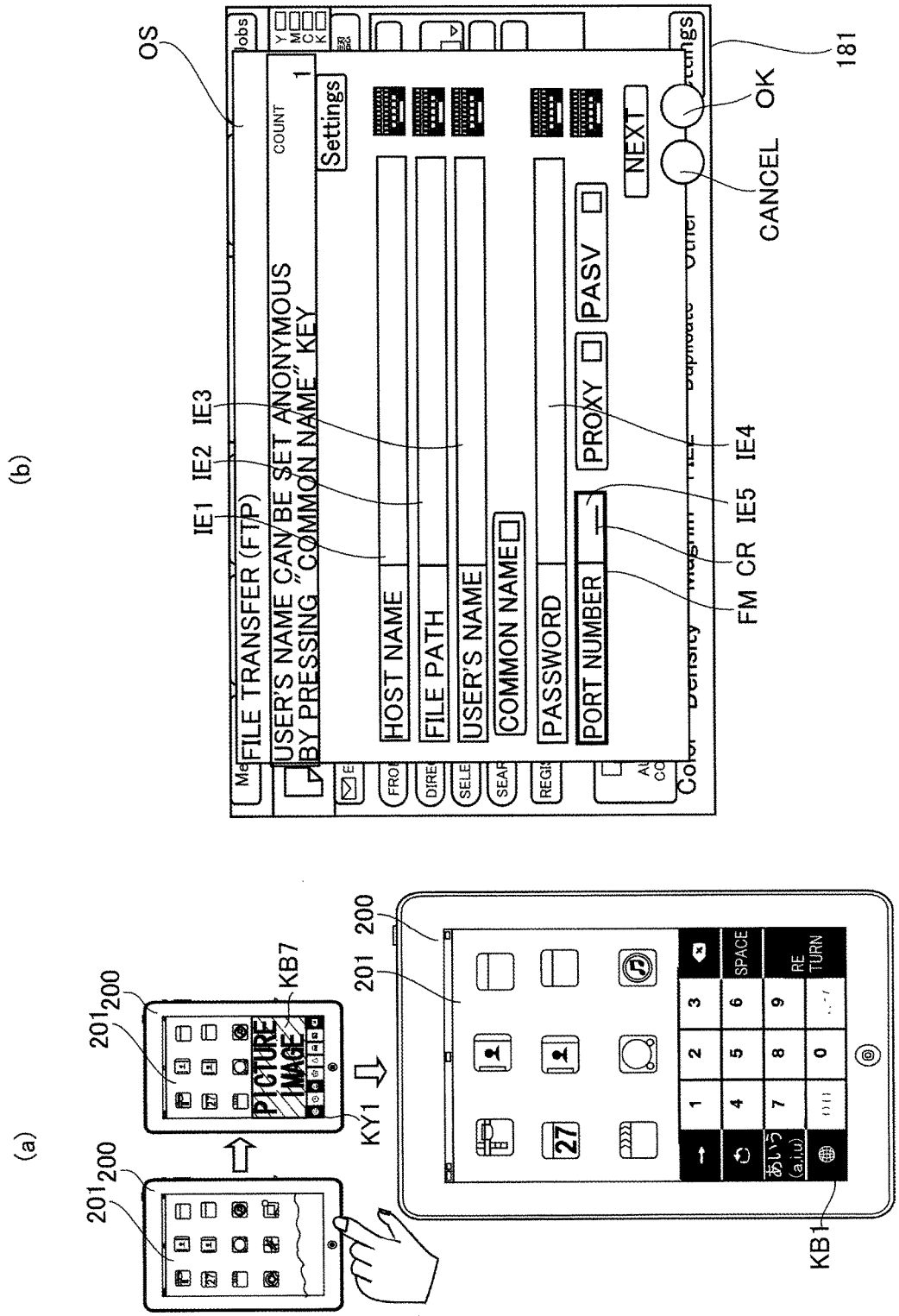
FIG. 20 is a diagram illustrating operation of MFP 100 and operation terminal 200 in a case where keyboard KB7 appears on touch panel 201 in a fourth embodiment of the present invention.

FIG. 20 is a diagram illustrating operation of MFP 100 and operation terminal 200 in a case where keyboard KB7 appears on touch panel 201 in a fourth embodiment of the present invention.

Referring to FIG. 20(a), when communication between MFP 100 and operation terminal 200 is started, the user operates operation panel 180 to allow the setting screen OS to appear on touch panel 181, as shown in FIG. 20(b). Meanwhile, the user operates operation terminal 200 to allow keyboard KB7 for inputting pictograms to appear on touch panel 201, as shown in FIG. 20(a).

Operation terminal 200 displays keyboard KB7 and then transmits the type of the displayed keyboard to MFP 100.

MFP 100 receives the type of keyboard from operation terminal 200. Here, among input areas IE1 to IE5 included in the setting screen OS, there is no input area that can accept an input through the software keys (pictograms) included in keyboard KB7. Keyboard KB7 includes switch key KY1 (FIG. 5) for switching the keyboard to be displayed on touch panel 201. In this case, MFP 100 decides, as an input accepting area, the input area that can accept an input through the software keys included in the keyboard that is switched to when switch key KY1 included in keyboard KB7 is pressed the minimum number of times (the keyboard that can be switched to by the least number of operation steps in a state in which keyboard KB7 appears on touch panel 201).

Specifically, when switch key KY1 of keyboard KB7 is pressed once on touch panel 201, the keyboard to be displayed on touch panel 201 is switched to keyboard KB1 for inputting numbers. MFP 100 therefore decides any one of input areas IE1, IE2, IE4, and IE5 that can accept number inputs, as an input accepting area.

In a case where there are a plurality of input areas that can accept number inputs, MFP 100 may accept, as an input accepting area, input area IE1 at the top of the input areas that can accept number inputs, as shown in FIG. 20(*b*). Alternatively, MFP 100 may accept, as an input accepting area, an input area displayed at the top of the input areas that have not yet accepted inputs, among input areas IE1, IE2, IE4, and IE5 that can accept number inputs.

MFP 100 may decide any one of input areas IE1 to IE5 included in the setting screen OS as an input accepting area, rather than deciding an input accepting area in the manner described above.

The user recognizes that input area IE5 is in the selected state by the cursor CR or the frame FM, and then presses switch key KY1 included in keyboard KB7 to manually switch the keyboard to be displayed on touch panel 201 to keyboard KB1, as shown in FIG. 20(*a*).

When an input accepting area is decided in the manner described above, MFP 100 may request operation terminal 200 to switch the keyboard to be displayed on touch panel 201 to a keyboard that includes software keys allowing input into the input accepting area. The keyboard to be displayed on touch panel 201 is thereby automatically switched to keyboard KB1.

In a case where the user switches the keyboard appearing on touch panel 201 to another type of keyboard and when there exists no input area suitable for the switched keyboard, MFP 100 may decide any one of the input areas IE1 to IE5 included in the setting screen OS, as an input accepting area.

Figure 21:
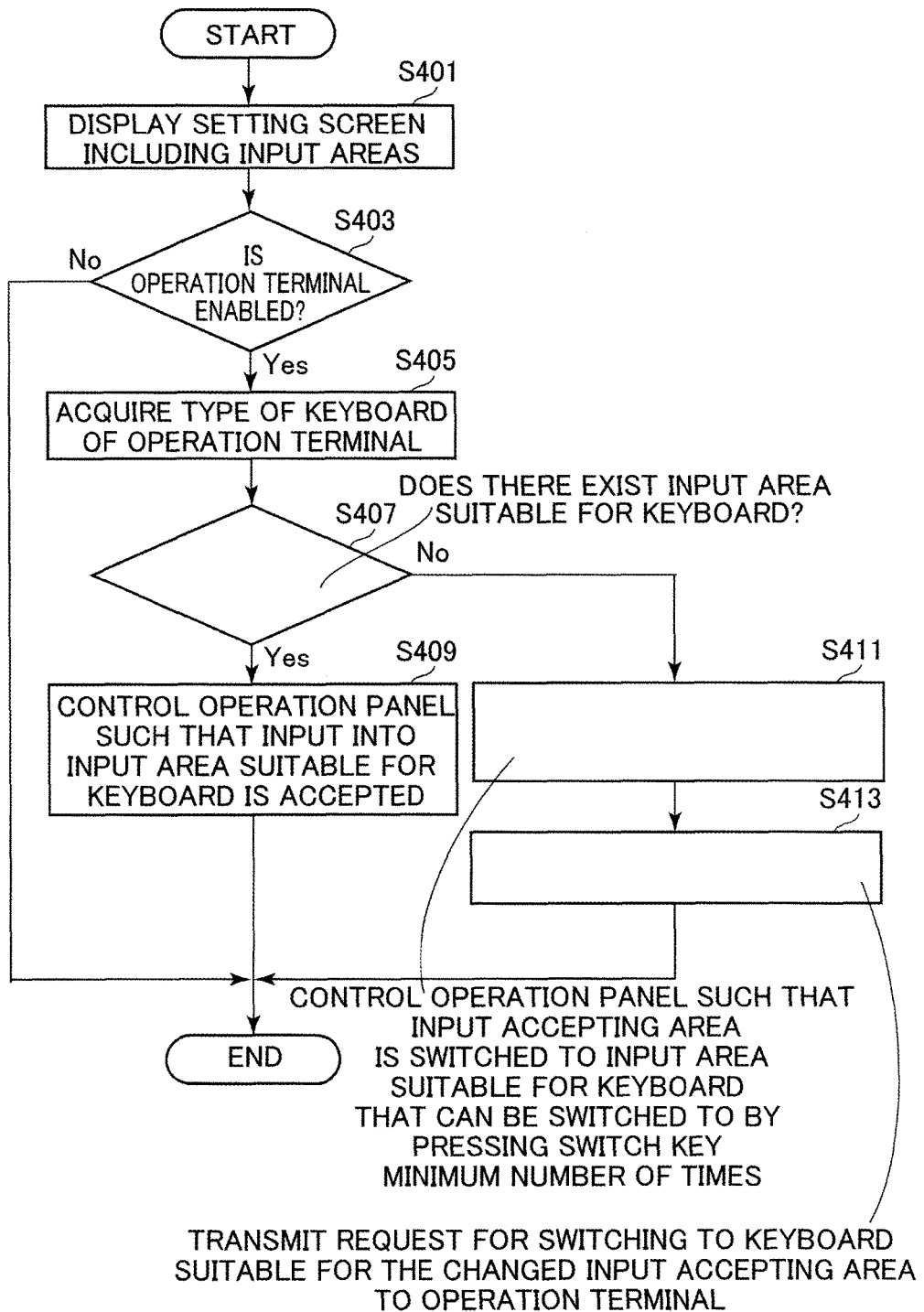
FIG. 21 is a flowchart showing operation of MFP 100 in the fourth embodiment of the present invention.

FIG. 21 is a flowchart showing operation of MFP 100 in the fourth embodiment of the present invention.

Referring to FIG. 21, when communication with operation terminal 200 is started, control unit 10 of MFP 100 displays a setting screen including input areas on touch panel 181, for example, in accordance with the operation accepted from the user (S401) and determines whether operation terminal 200 is enabled (S403).

In step S403, if it is determined that operation terminal 200 is disabled (No in S403), the process of control unit 10 ends.

In step S403, if it is determined that operation terminal 200 is enabled (Yes in S403), control unit 10 acquires the type of the keyboard appearing on touch panel 201 from operation terminal 200 (S405). Control unit 10 then determines whether there exists an input area suitable for the keyboard, among the input areas included in the setting screen (S407).

In step S407, if it is determined that there exists an input area suitable for the keyboard (Yes in S407), control unit 10 controls operation panel 180 such that inputs into the input area suitable for the keyboard are accepted (S409). The process then ends.

In step S407, if it is determined that there exists no input area suitable for the keyboard (No in S407), control unit 10 controls operation panel 180 such that the input accepting area is switched to an input area suitable for the keyboard that can be switched to by pressing the switch key the minimum number of times (S411). Control unit 10 then transmits, to operation terminal 200, a request for switching to the keyboard suitable for the changed input accepting area (S413). The process then ends.

Figure 22:
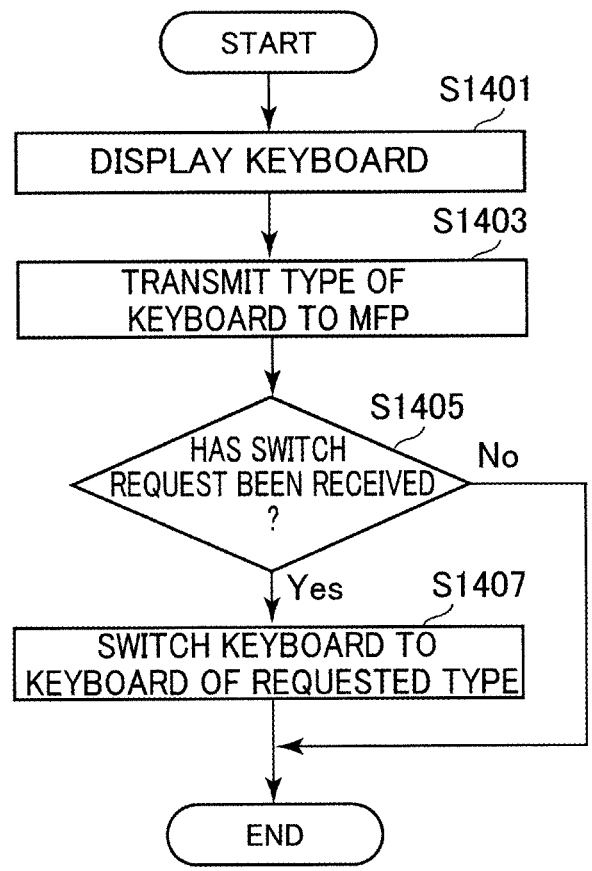
FIG. 22 is a flowchart showing operation of operation terminal 200 in the fourth embodiment of the present invention.

FIG. 22 is a flowchart showing operation of operation terminal 200 in the fourth embodiment of the present invention.

Referring to FIG. 22, when communication with MFP 100 is started, control unit 210 of operational terminal 200 displays a keyboard on touch panel 201 (S1401) and transmits the type of the displayed keyboard to MFP 100 (S1403). Control unit 210 then determines whether a switch request has been received from MFP 100 (S1405).

In step S1405, if it is determined that a switch request has been received (Yes in S1405), control unit 210 switches the keyboard to be displayed on touch panel 201 to the keyboard of the requested type of (S1407). The process then ends.

In step S1405, if it is determined that a switch request has not been received (No in S1405), the process of control unit 210 ends.

The processes other than those described above, the configuration of the image forming system, and the like are the same as those in the first embodiment. The same parts are denoted with the same reference characters and a description thereof will not be repeated.

According to the present embodiment, even when there exists no input area suitable for the keyboard appearing on touch panel 201, among the input areas included in the setting screen, a suitable input area is set as an input accepting area. Accordingly, the user can switch the keyboard to be displayed on touch panel 201 to the keyboard that includes software keys allowing input into the input accepting area with a smaller number of steps (for example, with a one-step operation).

[Fifth Embodiment]

Figure 23:
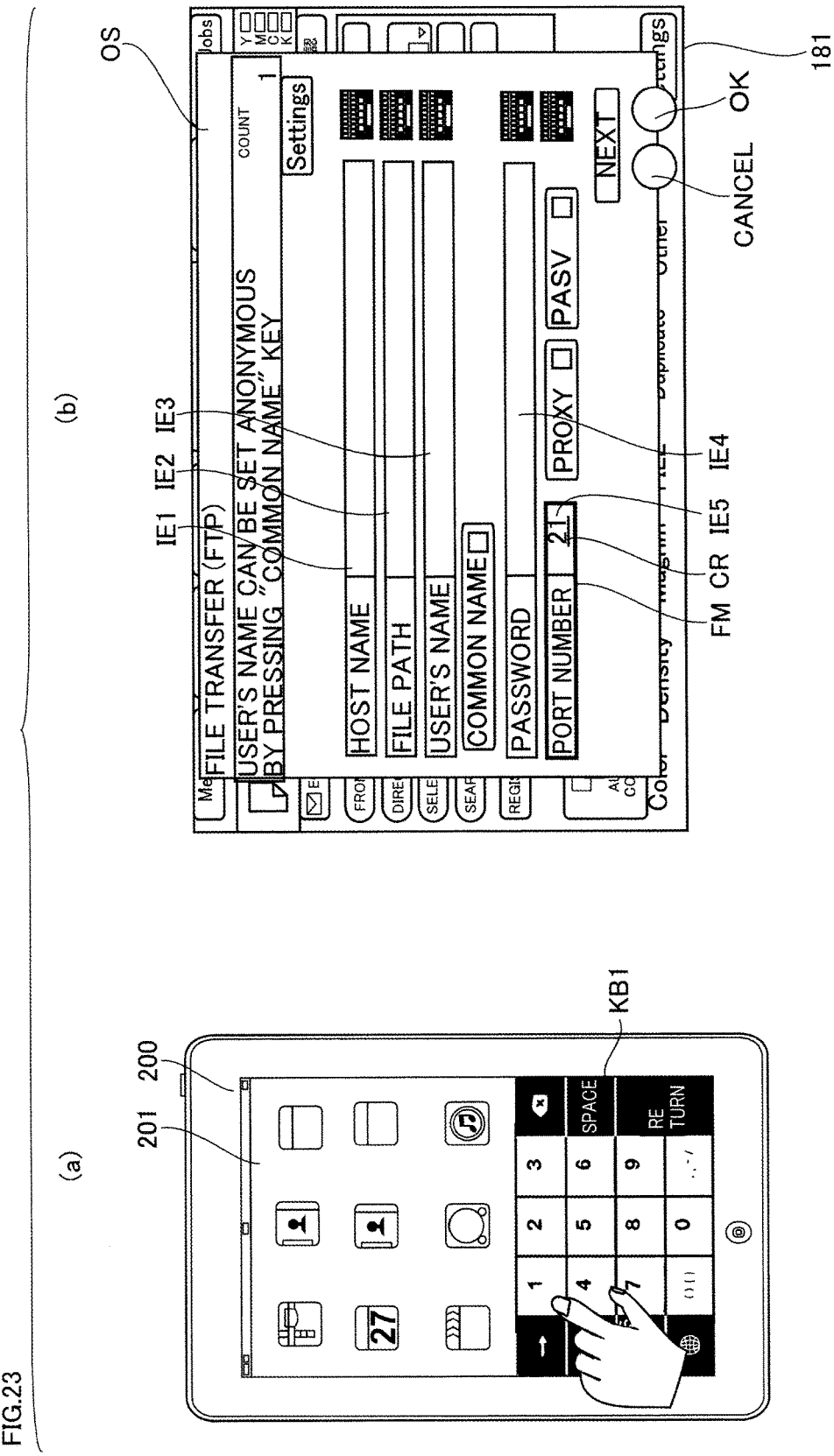
FIG. 23 is a diagram schematically showing a state in which numbers are input in input area IE5 of setting screen OS in a fifth embodiment of the present invention.

FIG. 23 is a diagram schematically showing a state in which numbers are input in input area IE5 of setting screen OS in a fifth embodiment.

Referring to FIG. 23, when communication between MFP 100 and operation terminal 200 is started, the user operates operation panel 180 to allow the setting screen OS to appear on touch panel 181, as shown in FIG. 23(*b*). Meanwhile, the user also operates operation terminal 200 to allow keyboard KB1 for inputting numbers to appear on touch panel 201, as shown in FIG. 23(*a*). When keyboard KB1 appears, operation terminal 200 transmits the type of the appearing keyboard to MFP 100. MFP 100 acquires the type of the keyboard from operation terminal 200 and then decides input area IE5 suitable for number inputs as an input accepting area and controls operation panel 180 such that inputs into input area IE5 are accepted.

The user inputs a number into input area IE5 by pressing a numeric key included in keyboard KB1. Operation terminal 200 accepts the press on the numeric key and transmits the information of the number corresponding to the pressed numeric key to MFP 100. MFP 100, receiving the number, accepts the number input into input area IE5 and displays the received number (here, "2" and "1") in input area IE5, as shown in FIG. 23(b).

Operation terminal 200 may transmit the coordinates of the pressed numeric key to MFP 100, and MFP 100 may specify the pressed numeric key based on the received type of keyboard and coordinates of numeric key and display the number corresponding to the specified numeric key in input area IE5.

FIG. 24 is a diagram illustrating operation of MFP 100 and operation terminal 200 in a case where the keyboard to be displayed on touch panel 201 is switched to keyboard KB3 in the fifth embodiment of the present invention.

Referring to FIG. 24(a), the user presses a numeric key and thereafter presses key KY1 twice. Operation terminal 200 accepts the operation of pressing key KY1 twice and then switches the keyboard to be displayed on touch panel 201 to keyboard KB3 for inputting alphabetic characters and transmits the type of the new (switched) keyboard to MFP 100. MFP 100 acquires the type of the new keyboard.

Here, input area IE5 as the input accepting area is an input area for accepting number inputs, whereas the new keyboard KB3 is a keyboard for inputting alphabetic characters. Input area IE5 therefore cannot accept inputs through the software keys included in keyboard KB3. In this case, MFP 100 confirms the number input accepted in input area IE5 and switches the input accepting area to any one of input areas IE1, IE2, IE3, and IE4 that can accept inputs through the software keys included in keyboard KB3 (the input area that can accept inputs of alphabetic characters).

When there are a plurality of input areas that can accept inputs of alphabetic characters, MFP 100 may switch the input accepting area to the input area IE1 at the top of the input areas that can accept inputs of alphabetic characters, as shown in FIG. 24(b). MFP 100 may switch the input accepting area to the input area displayed at the top of the input areas that have not yet accepted inputs, among input areas IE1, IE2, IE3, and IE4 that can accept inputs of alphabetic characters.

Figure 25:
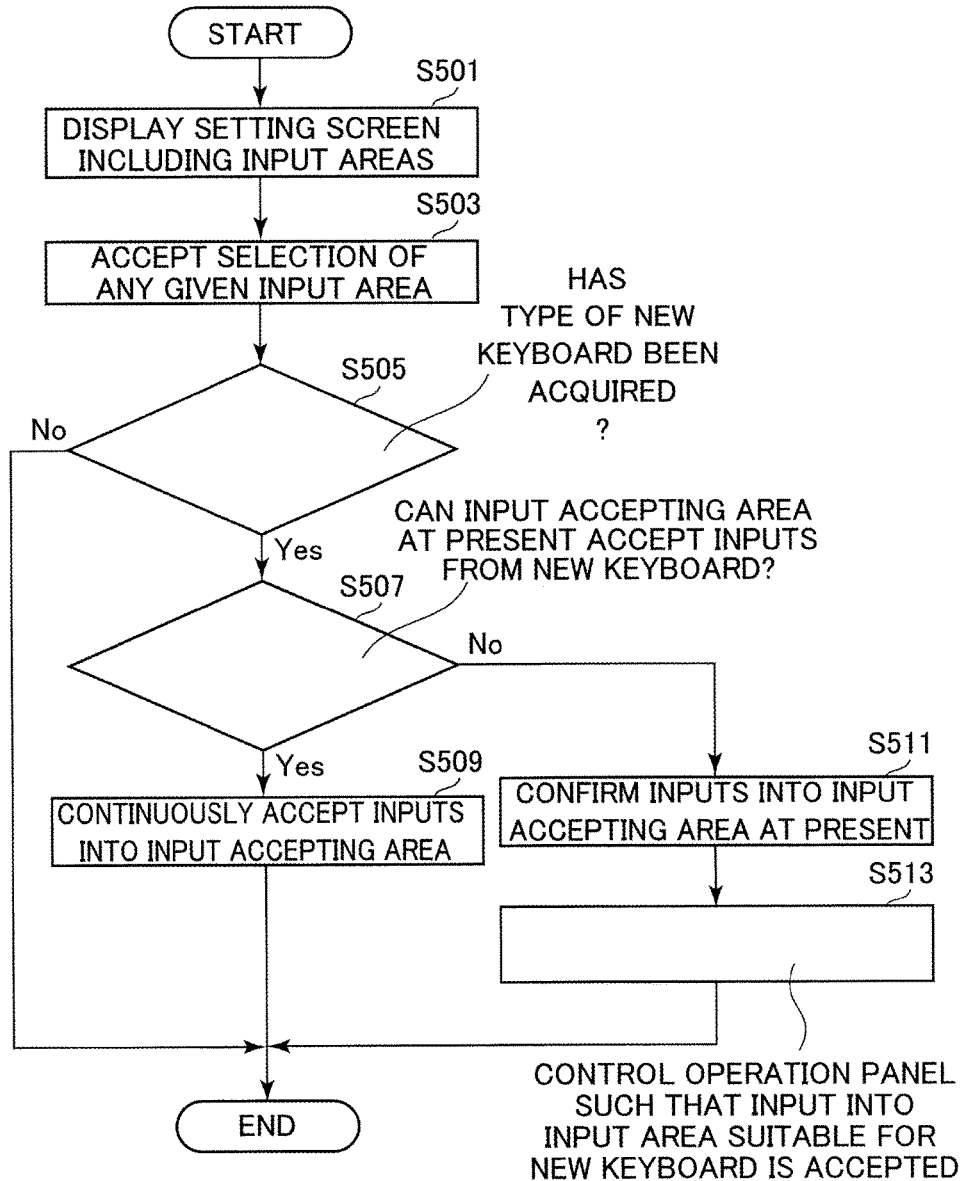
FIG. 25 is a flowchart showing operation of MFP 100 in the fifth embodiment of the present invention.

FIG. 25 is a flowchart showing operation of MFP 100 in the fifth embodiment of the present invention.

Referring to FIG. 25, when communication with operation terminal 200 is started, control unit 10 of MFP 100 displays a setting screen including input areas on touch panel 181, for example, in accordance with the operation accepted from the user (S501) and accepts an input into any given input area from operation terminal 200 (S503). Control unit 10 then determines whether the type of the new keyboard displayed on touch panel 201 has been acquired from operation terminal 200 (S505).

In step S505, if it is determined that the type of the new keyboard has not been acquired (No in S505), the process of control unit 10 ends.

In step S505, if it is determined that the type of the new keyboard has been acquired (Yes in S505), control unit 10 determines whether the input accepting area at present can accept inputs from the acquired type of keyboard (S507).

In step S507, if it is determined that the input accepting area at present can accept inputs from the accepted type of keyboard (Yes in S507), control unit 10 continuously accepts inputs into the input accepting area at present (S509). The process then ends.

In step S507, if it is determined that the input accepting area at present cannot accept inputs from the acquired type of keyboard (No in S507), control unit 10 confirms inputs into the input accepting area at present (S511). Control unit 10 then controls operation panel 180 such that inputs into an input area suitable for the new keyboard are accepted (S513). The process then ends.

FIG. 26 is a flowchart showing operation of operation terminal 200 in the fifth embodiment of the present invention.

Referring to FIG. 26, when communication with MFP 100 is started, control unit 210 of operational terminal 200 displays a keyboard on touch panel 201, for example, in accordance with the user's operation (S1501) and transmits the type of the displayed keyboard to MFP 100 (S1503). Control unit 210 then accepts inputs through the keyboard from the user (S1505) and transmits the accepted inputs to MFP 100 (S1507). Control unit 210 then determines whether an operation of switching the keyboard appearing on touch panel 201 to a new keyboard has been accepted (S1509).

In step S1509, if it is determined that an operation of switching to a new keyboard has not been accepted (No in S1509), the process of control unit 10 ends.

In step S1509, if it is determined that an operation of switching to a new keyboard has been accepted (Yes in S1509), control unit 10 switches the keyboard appearing on touch panel 201 to a new keyboard in accordance with the accepted operation (S1511) and transmits the type of the new keyboard to MFP 100 (S1513). The process then ends.

The processes other than those described above, the configuration of the image forming system, and the like are the same as those in the first embodiment. The same parts are denoted with the same reference characters and a description thereof will not be repeated.

According to the present embodiment, the user can confirm the inputs made so far by perform the operation of switching the keyboard to be displayed on touch panel 201 and can continuously make inputs into another input area suitable for the switched keyboard.

[Others]

The setting screen can be of any type that includes at least one (preferably, a plurality of) input areas that can accept inputs through the software keys included in any one of a plurality of input screens on the operation terminal that are configured with software key groups different from each other. The setting screen may be the one that includes an input area for accepting an input of the number of copies of print, an input area for accepting an input of the enlargement/reduction ratio, and other input areas. The kinds of characters or symbols of which inputs are accepted in an input area included in the setting screen may be set as desired.

The foregoing embodiments can be combined as appropriate. For example, the operation of MFP 100 and operation terminal 200 when a setting screen is displayed on touch panel 181 of operation panel 180 in any one of the first to third embodiments may be combined with the operation of MFP 100 and operation terminal 200 when the keyboard to be displayed on touch panel 201 is switched in the fifth embodiment.

The processing in the foregoing embodiments may be performed either by software or by a hardware circuit. A program for executing the processing in the foregoing embodiments may be provided. A recording medium, such as a CD-ROM, a flexible-disk, a hard disk, a ROM, a RAM, or a memory card, encoded with the program may be provided to users. The program is executed by a computer such as a CPU. The program may be downloaded to the apparatus through a communication circuit such as the Internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus that accepts an input through an input screen selectively displayed on a display of a separate operation terminal from among a plurality of input screens, comprising:
   a display unit for displaying a plurality of input areas configured to accept inputs through the input screen appearing on the display of the separate operation terminal;
   a type acquisition unit for acquiring a type of a software key appearing for the separate operation terminal input screen being selectively displayed on the display of the separate operation terminal, the type of the software key being one among a plurality of types of software keys different from each other; and
   an area decision unit for deciding an input area from the plurality of input areas being displayed on the display unit, the decided input area corresponding to the type acquired by the type acquisition unit based on the acquired type of the software key, the decided input area being an input accepting area that accepts inputs with the acquired type of the software key through the input screen appearing on the display of the operation terminal.

2. The information processing apparatus according to claim 1, wherein the area decision unit decides, as the input accepting area, an input area that can accept an input through a software key included in the input screen of the type acquired by the type acquisition unit.

3. The information processing apparatus according to claim 2, wherein in a case where, among the plurality of input areas, there exists no input area that can accept an input through a software key included in the input screen of the type acquired by the type acquisition unit, the area decision unit decides any one of the plurality of input areas as the input accepting area.

4. The information processing apparatus according to claim 3, wherein in a case where, among the plurality of input areas, there exists no input area that can accept an input through a software key included in the input screen of the type acquired by the type acquisition unit, when the input screen of the type acquired by the type acquisition unit includes a switch key that is a software key for switching an input screen to be displayed on the display of the operation terminal, the area decision unit decides, as the input accepting area, an input area that can accept an input through a software key included in an input screen that is switched to when the switch key is pressed a minimum number of times.

5. The information processing apparatus according to claim 3, further comprising a switch request unit, wherein in a case where, among the plurality of input areas, there exists no input area that can accept an input through a software key included in the input screen of the type acquired by the type acquisition unit, the switch request unit requests the operation terminal to switch an input screen to be displayed on the display of the operation terminal to an input screen that includes a software key allowing input into the input accepting area.

6. The information processing apparatus according to claim 2, wherein in a case where there are a plurality of input areas that can accept an input through a software key included in the input screen of the type acquired by the type acquisition unit, the area decision unit decides, as the input accepting area, an input area displayed at the top of input areas that can accept an input through a software key included in the input screen of the type acquired by the type acquisition unit.

7. The information processing apparatus according to claim 1, further comprising:
   another type acquisition unit for acquiring a type of a new input screen displayed on the display of the separate operation terminal after an input into the input accepting area is accepted;
   a confirmation unit for confirming an input accepted in the input accepting area in a case where the input accepting area cannot accept an input through a software key included in the input screen of the type acquired by another type acquisition unit; and
   an area switch unit for switching the input accepting area to an input area that can accept an input through a software key included in the input screen of the type acquired by another type acquisition unit, in a case where the input accepting area cannot accept an input through a software key included in the input screen of the type acquired by another type acquisition unit.

8. An information processing apparatus that accepts an input through an input screen selectively displayed on a display of a separate operation terminal from among a plurality of input screens, comprising:
   a display unit for displaying a plurality of input areas configured to accept inputs of a specific type through the input screen appearing on the display of the separate operation terminal, and for receiving a selection of one of the plurality of input accepting areas; and
   a display request unit requesting the separate operation terminal to display the input screen including a software key configured to provide the inputs of the specific type into the selected input accepting area, the specific type being based on the selected input accepting area and being one among a plurality of types of software keys different from each other.

9. The information processing apparatus according to claim 8, further comprising:
   a type acquisition unit for acquiring a type of a software key appearing for the input screen displayed on the display of the separate operation terminal among a plurality of types of software keys different from each other;
   wherein in case where an input cannot be made into an input accepting area selected from among at least one input area through the type of the software key acquired by the type acquisition unit, the display unit requests the separate operation terminal to display an input screen including a software key allowing input into the selected input accepting area.

10. A non-transitory computer-readable recording medium encoded with a control program for an information processing apparatus that accepts an input through an input screen selectively displayed on a display of a separate operation terminal from among a plurality of input screens, the information processing apparatus including a display unit, the control program causing a computer to execute processing comprising:
   establishing communication with the separate operation terminal;
   displaying, on the display unit of the information processing apparatus, a plurality of input areas configured to accept inputs of a specific type through the input screen appearing on the display of the separate operation terminal;

receiving a selection of one of the plurality of input accepting areas; and requesting the separate operation terminal to display an input screen including a software key configured to provide the inputs of the specific type into the selected input accepting area, the specific type being based on the selected input accepting area and being one among a plurality of types of software keys different from each other.

11. The control program according to claim 10, further comprising acquiring a type of a software key appearing for the input screen displayed on the display of the separate operation terminal among a plurality of types of software keys different from each other;

wherein in case where an input cannot be made into an input accepting area selected from among at least one input area through the acquired type of the software key, the display unit requests the separate operation terminal to display an input screen including a software key allowing input into the selected input accepting area.

12. A non-transitory computer-readable recording medium encoded with a control program for an information processing apparatus that accepts an input through an input screen selectively displayed on a display of a separate operation terminal from among a plurality of input screens, the information processing apparatus including a display unit, the control program causing a computer to execute processing comprising:

displaying, on the display unit, a plurality of input areas configured to accept inputs through the input screen appearing on the display of the separate operation terminal;

acquiring a type of a software key displayed for the input screen being selectively displayed on the display of the separate operation terminal, the type of the software key being one among a plurality of types of software keys different from each other; and deciding an input area from the plurality of input areas being displayed on the display unit, the decided input area corresponding to the type acquired by the type acquisition unit, based on the acquired type of the software key, the decided input area being an input accepting area that accepts inputs with the acquired type of the software key through an input screen selectively displayed on the display of the separate operation terminal.

13. The control program according to claim 12, wherein the input accepting area accepts an input through a software key included in the input screen of the acquired type.

14. The control program according to claim 13, wherein in a case where, among the plurality of input areas, there exists no input area that can accept an input through a software key included in the input screen of the acquired type, deciding any one of the plurality of input areas as the input accepting area.

15. The control program according to claim 14, wherein in a case where, among the plurality of input areas, there exists no input area that can accept an input through a software key included in the input screen of the type acquired type, when the input screen of the acquired type includes a switch key that is a software key for switching an input screen to be displayed on the display of the operation terminal, deciding, as the input accepting area, an input area that can accept an input through a software key included in an input screen that is switched to when the switch key is pressed a minimum number of times.

16. The control program according to claim 14, further comprising switching in a case where, among the plurality of input areas, there exists no input area that can accept an input through a software key included in the input screen of the acquired type, the switching requesting the separate operation terminal to switch an input screen to be displayed on the display of the separate operation terminal to an input screen that includes a software key allowing input into the input accepting area.

17. The control program according to claim 13, wherein in a case where there are a plurality of input areas that can accept an input through a software key included in the input screen of the acquired type, deciding, as the input accepting area, an input area displayed at the top of input areas that can accept an input through a software key included in the input screen of the acquired type.

18. A non-transitory computer-readable recording medium encoded with a control program for an operation terminal that selectively displays, on a display, an input screen for making an input into a separate information processing apparatus, from among a plurality of input screens, the control program causing a computer to execute processing comprising:

establishing communication with the separate information processing apparatus;

receiving a request from the separate information processing apparatus for displaying an input screen that includes a particular software key providing inputs of a specific type based on a selected input accepting area; and displaying the input screen that includes the particular software key configured to provide the inputs of the specific type on the display, the inputs of the specific type being based on the selected input accepting area and being one among a plurality of types of software keys different from each other, in response to the request.

* * * * *